United States Patent
Yanagisawa et al.

(10) Patent No.: US 9,042,471 B2
(45) Date of Patent: *May 26, 2015

(54) RECEIVING DEVICE, SIGNAL PROCESSING DEVICE, AND SIGNAL PROCESSING METHOD

(71) Applicant: Renesas Electronics Corporation, Kawasaki-shi, Kanagawa (JP)

(72) Inventors: Kiyoshi Yanagisawa, Kawasaki (JP); Osamu Inagawa, Kawasaki (JP)

(73) Assignee: Renesas Electronics Corporation, Kanagawa (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/337,534

(22) Filed: Jul. 22, 2014

(65) Prior Publication Data

US 2014/0334560 A1 Nov. 13, 2014

Related U.S. Application Data

(63) Continuation of application No. 13/674,222, filed on Nov. 12, 2012, now Pat. No. 8,817,902.

(30) Foreign Application Priority Data

Nov. 18, 2011 (JP) .................................. 2011-252262

(51) Int. Cl.
| | |
|---|---|
| *H04K 1/10* | (2006.01) |
| *H04L 27/26* | (2006.01) |
| *H04B 3/46* | (2006.01) |
| *H04B 3/54* | (2006.01) |
| *H04L 25/06* | (2006.01) |
| *H04L 27/38* | (2006.01) |

(52) U.S. Cl.
CPC .............. *H04L 27/2646* (2013.01); *H04B 3/46* (2013.01); *H04B 3/54* (2013.01); *H04L 27/265* (2013.01); *H04L 25/067* (2013.01); *H04L 27/3809* (2013.01); *H04B 3/542* (2013.01)

(58) Field of Classification Search
USPC .......................... 375/260, 267, 299, 341, 349
See application file for complete search history.

(56) References Cited

U.S. PATENT DOCUMENTS

| 7,971,128 B2 | 6/2011 | Sugiura et al. |
| 2002/0037057 A1* | 3/2002 | Kroeger et al. ............... 375/329 |

(Continued)

FOREIGN PATENT DOCUMENTS

| JP | 2002-111626 A | 4/2002 |
| JP | 2008-131364 A | 6/2008 |

(Continued)

*Primary Examiner* — Kabir A Timory
(74) *Attorney, Agent, or Firm* — Foley & Lardner LLP

(57) ABSTRACT

A receiving device according to the present invention includes: a receiver for receiving an OFDM symbol that is modulated by phase shift keying; an FFT processor for applying an FFT process to the received OFDM symbol to obtain a subcarrier signal; a demapping unit for demapping the subcarrier signal to generate a bit string; a norm calculator for calculating the norm of the subcarrier; a weighting factor generator for generating a weighting factor by taking the statistics of the calculated norm; and a weighting unit for obtaining a soft decision value by weighting the bit string after demapping, based on the particular weighting factor. Thus, the receiving device can obtain a soft decision value to achieve good decoding performance with a small number of known signals and processes.

14 Claims, 21 Drawing Sheets

(56) References Cited

U.S. PATENT DOCUMENTS

| | | |
|---|---|---|
| 2004/0136313 A1 | 7/2004 | Goldstein et al. |
| 2008/0120528 A1* | 5/2008 | Sawada .................. 714/780 |
| 2009/0207925 A1 | 8/2009 | Liu |

FOREIGN PATENT DOCUMENTS

| | | |
|---|---|---|
| JP | 2008-148277 A | 6/2008 |
| JP | 2011-166330 A | 8/2011 |

* cited by examiner

FIG. 18

| | A | B | C | D | E | F | G | H | I | J | K | L | M | N | O | P | Q | R | S | T |
|---|---|---|---|---|---|---|---|---|---|---|---|---|---|---|---|---|---|---|---|---|
| 1 | 1-1 | 1-2 | 1-3 | 1-4 | 1-5 | 1-6 | 1-7 | 1-8 | 1-9 | 1-10 | 1-11 | 1-12 | 1-13 | 1-14 | 1-15 | 1-16 | 1-17 | 1-18 | 1-19 | 1-20 |
| 2 | 2-1 | 2-2 | 2-3 | 2-4 | 2-5 | 2-6 | 2-7 | 2-8 | 2-9 | 2-10 | 2-11 | 2-12 | 2-13 | 2-14 | 2-15 | 2-16 | 2-17 | 2-18 | 2-19 | 2-20 |
| 3 | 3-1 | 3-2 | 3-3 | 3-4 | 3-5 | 3-6 | 3-7 | 3-8 | 3-9 | 3-10 | 3-11 | 3-12 | 3-13 | 3-14 | 3-15 | 3-16 | 3-17 | 3-18 | 3-19 | 3-20 |
| ... | | | | | | | | | | | | | | | | | | | | |
| n−1 | n−1-1 | n−1-2 | n−1-3 | n−1-4 | n−1-5 | n−1-6 | n−1-7 | n−1-8 | n−1-9 | n−1-10 | n−1-11 | n−1-12 | n−1-13 | n−1-14 | n−1-15 | n−1-16 | n−1-17 | n−1-18 | n−1-19 | n−1-20 |
| n | n-1 | n-2 | n-3 | n-4 | n-5 | n-6 | n-7 | n-8 | n-9 | n-10 | n-11 | n-12 | n-13 | n-14 | n-15 | n-16 | n-17 | n-18 | n-19 | n-20 |

SUBCARRIER NUMBER / SYMBOL TIMING

RECEIVING DEVICE, SIGNAL PROCESSING DEVICE, AND SIGNAL PROCESSING METHOD

CROSS-REFERENCE TO RELATED APPLICATIONS

This application is a continuation of U.S. application Ser. No. 13/674,222, filed Nov. 2, 2012, which claims benefit of priority from the prior Japanese Application No. 2011-252262, filed Nov. 18, 2011; the entire contents of all of which are incorporated herein by reference.

BACKGROUND

The present invention relates to a receiving device for obtaining received data by receiving a signal that is modulated by phase shift keying. In particular, the present invention relates to a receiving device for obtaining received data by receiving an OFDM symbol that is modulated by phase shift keying in power line communication through a power line.

There has been developed a technology for power line communication through a power line as a communication medium. In the next-generation power line communication, Orthogonal Frequency Division Multiplexing (OFDM) has been discussed as the main transmission scheme in terms of high-speed communication, noise immunity, frequency usage efficiency and the like.

Japanese Unexamined Patent Publication No. 2002-111626 discloses a receiving device having good decoding characteristics while reducing the amount of calculation required for decoding in a digital radio communication system using the OFDM transmission scheme. The receiving device normalizes each subcarrier signal by a preamble which is a known signal. Then, the receiving device weights the signal that is decoded from the constellation by using the received power of the subcarrier corresponding to the particular preamble. Here, the receiving device reduces the quantized bit by rounding the weighted signal based on the power average of all the subcarriers of the preamble.

With this configuration, it is possible to select a bit that contributes to Viterbi decoding more effectively than selecting an effective bit simply by cutting the lower bit off of the weighted signal. As a result, it is possible to maintain high decoding performance.

Japanese Unexamined Patent Publication No. 2008-131364 discloses a receiving device that prevents the reduction in the Viterbi decoding accuracy when interference occurs in the desired wave in a digital radio communication system using the OFDM transmission scheme. The receiving device obtains the variation from a reference symbol point of the received signal. When the variation is greater than a predetermined reference value, the receiving device determines that interference with the desired wave occurs, and corrects the soft decision value so that the contribution to decoding is reduced.

With this configuration, if the received power difference between the desired wave and the interference wave is small, the soft decision value is corrected by detecting the interference occurred in the desired wave. Thus, it is possible to prevent the reduction in the Viterbi decoding accuracy and increase the communication quality.

SUMMARY

The receiving device of Japanese Unexamined Patent Publication No. 2002-111626 only uses known signals, such as preamble and pilot, to normalize and weight each subcarrier signal after a Fast Fourier Transform (FFT) process. This is because the phase and amplitude of each subcarrier signal vary according to the transmission characteristics between a transmitting device and a receiving device, so that it would not be easy to figure out what signal is transmitted from the transmitting device, on the side of the receiving device.

Further, the normalization and weighting are based on the subcarrier power. This is in order to cancel the influence that the strength and phase of the signal vary for each subcarrier due to the influence of the frequency selective phasing.

Here, in the radio communication with free space as a medium and in the wired communication with communication cable as a medium, the influence of the noise floor of the receiving device is large. On the other hand, in the power communication, the influence of the noise generated by the equipment coupled to a power line is large. This is because communication is performed using the power line that is not supposed to be a communication medium. For this reason, when weighting is performed by the received power of each subcarrier as described in Japanese Unexamined Patent Publication No. 2002-111626, the probability of incorrect weighting due to the influence of the noise increases, resulting in the degradation of the decoding characteristics.

In addition, the number of processes also increases as weighting is performed by a known signal with no transmission information, such as preamble or pilot signal. This is the same in the receiving device described in Japanese Unexamined Patent Publication No. 2008-131364. Thus, it is necessary to obtain the correct position of a reference symbol point by normalizing both amplitude and phase by using the known signal. This is because, in Japanese Unexamined Patent Publication No. 2008-131364, an EVM calculator of the receiving device obtains the variation between the signal point location of the received signal and the reference symbol point, and generates the evaluation of the variation to perform weighting for a soft decision.

As described above, in Japanese Unexamined Patent Publication Nos. 2002-111626 and 2008-131364, it is necessary to provide a large number of known signals with no transmission information, so that there is a problem that the throughput decreases while the number of processes for weighting increases.

According to a first aspect of the present invention, there is provided a receiving device including: a receiver for receiving an OFDM symbol that is modulated by phase shift keying; an FFT processor for applying an FFT process to the received OFDM symbol to obtain a subcarrier signal; a demapping unit for demapping the subcarrier signal to generate a bit string; a norm calculator for calculating the norm of the subcarrier signal; a weighting factor generator for generating a weighting factor by taking the statistics of the calculated norm; and a weighting unit for weighting the bit string after demapping based on the particular weighting factor.

With this configuration, it is possible to obtain a soft decision value by taking the statistics of the norm that is ideally constant, and by generating an appropriate weighting factor based on the variation of the statistics of the norm. As a result, it is possible to achieve good reception performance with a small number of processes.

Further, according to a second aspect of the present invention, there is provided a signal processing device including: an FFT processor for obtaining a subcarrier signal by applying an FFT process to an input OFDM symbol; a demapping unit for demapping the subcarrier signal to generate a bit string; a norm calculator for calculating the norm of the subcarrier signal; a weighting factor generator for generating a weighting factor by taking the statistics of the calculated norm; and a weighting unit for weighting the bit string after demapping based on the particular weighting factor to obtain a soft decision value.

With this configuration, it is possible to obtain a soft decision value by taking the statistics of the norm that is ideally constant, and by generating an appropriate weighting factor from the variation of the statistics of the norm. As a result, it is possible to obtain a soft decision value to achieve good decoding performance with a small number of processes.

Further, according to a third aspect of the present invention, there is provided a signal processing method including the steps of: obtaining a subcarrier signal by applying an FFT process to an input OFDM symbol; calculating a norm of the subcarrier signal; generating a weighting factor by taking the statistics of the calculated norm; and weighting the bit string generated by demapping the subcarrier signal based on the particular weighting factor to obtain a soft decision value.

With this configuration, it is possible to obtain a soft decision value by taking the statistics of the norm that is ideally constant, and by generating an appropriate weighting factor from the variation of the statistics of the norm. As a result, it is possible to obtain a soft decision value to achieve good decoding performance with a small number of processes.

According to the present invention, it is possible to obtain a soft decision value showing good decoding characteristics, without obtaining the reference symbol point by a known signal. Thus, the throughput can be improved by eliminating the use of known signals. In addition, the number of processes required for the generation of the soft decision value can be reduced.

BRIEF DESCRIPTION OF THE DRAWINGS

FIG. 18 is a view of a norm variance table showing the norm variance in the symbol positions of the individual subcarriers;

DETAILED DESCRIPTION

Figure 1:
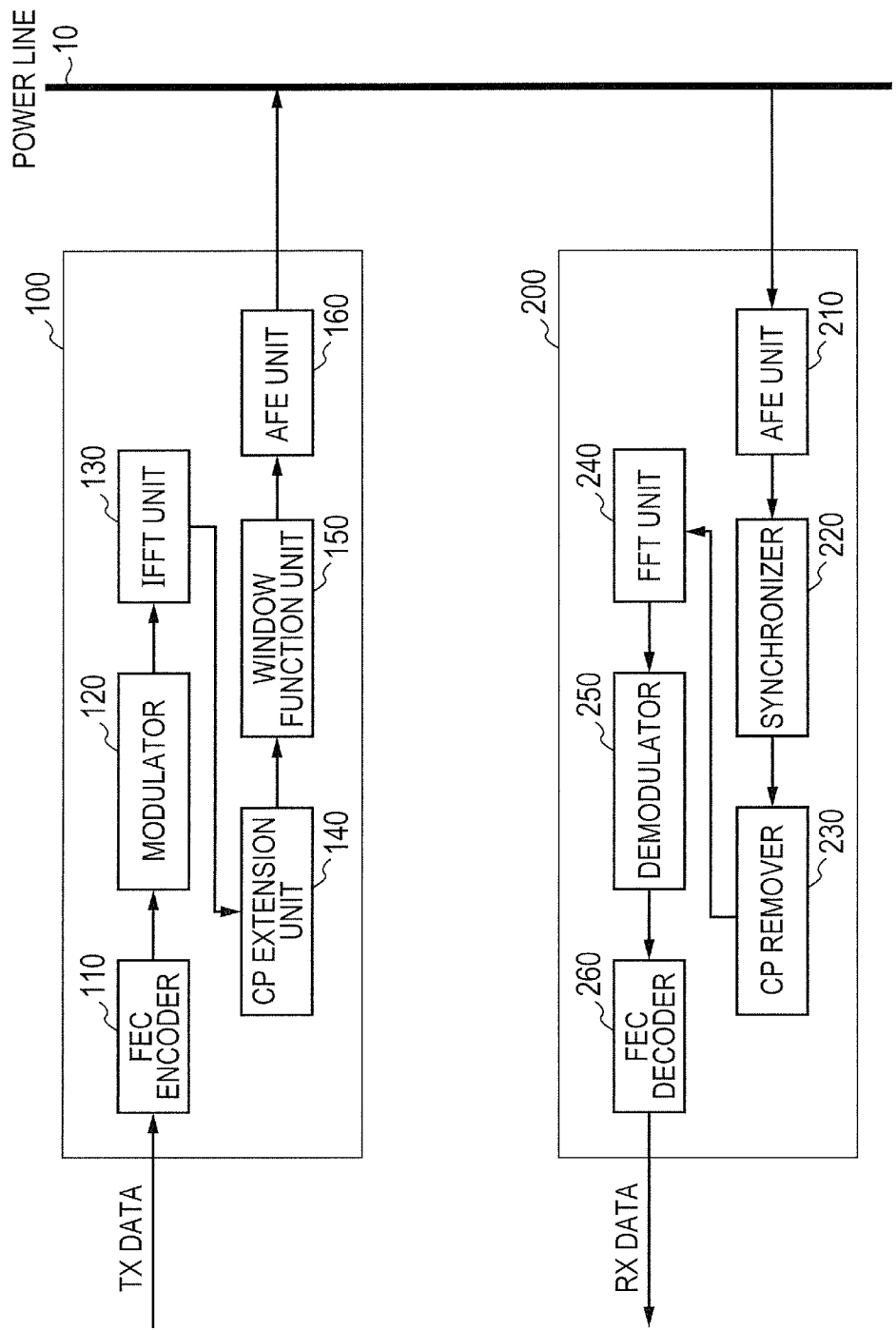
FIG. 1 is a block diagram of a power line communication system according to the present invention.

Embodiments of the present invention will be described with reference to the accompanying drawings. The following description illustrates the preferred embodiments of the present invention, and the scope of the present invention is not limited to the exemplary embodiments to be described below. Note that components having substantially the same functions are denoted by the same reference numerals throughout the drawings, and the repetitive description thereof is omitted according to need.

First Embodiment

Hereinafter, a first embodiment of the present invention will be described with reference to the drawings. FIG. 1 is a block diagram of a power line communication system 1000 according to the first embodiment of the present invention. In the power line communication system 1000, a transmitting device 100 and a receiving device 200 are communicably coupled through a power line 10.

First, the configuration of the transmitting device 100 will be described. The transmitting device 100 includes a forward error corrector (FEC) encoder 110, a modulator 120, an inverse fast Fourier transform (IFFT) unit 130, a cyclic prefix (CP) extension unit 140, a window function unit 150, and an analog front end (AFE) unit 160.

The FEC encoder 110 applies an encoding process to the TX data by using forward error correction coding such as convolutional coding.

The modulator 120 applies modulation to the coded TX data. Here, the modulator 120 performs modulation by phase shift keying (hereinafter referred to as PSK). This is because the power line communication uses a power line with large amplitude noise as a communication medium, so that it is difficult to modulate in the amplitude direction. The modulator 120 maps the coded TX data into a reference symbol point on the complex plane (IQ plane). Then, the modulator 120 associates the mapped data to a plurality of subcarriers that are orthogonal on the frequency axes in order to generate subcarrier signals. More specifically, the modulator 120 selects the modulation method to be used by taking into account the signal noise ratio (SNR), from differential phase shift keying schemes such as Differential Binary Phase Shift Keying (DBPSK), Differential Quadrature Phase Shift Keying (DQPSK), and Differential 8-Phase Shift Keying (D8PS). Then, the modulator 120 performs modulation using the modulation method determined as described above.

The IFFT unit 130 converts the frequency domain signal into a time domain signal by applying an inverse fast Fourier transform to the subcarrier signal generated by the modulator 120.

The CP extension unit 140 adds the CP to the signal that is converted into the time domain by the IFFT unit 130.

The window function unit 150 applies a window process to the signal to which the CP is added.

The AFE unit 160 converts the window processed signal into an analog signal and applies the analog signal to the power line 10. In this way, the AFE unit 160 transmits the signal (OFDM symbol).

Figure 2:
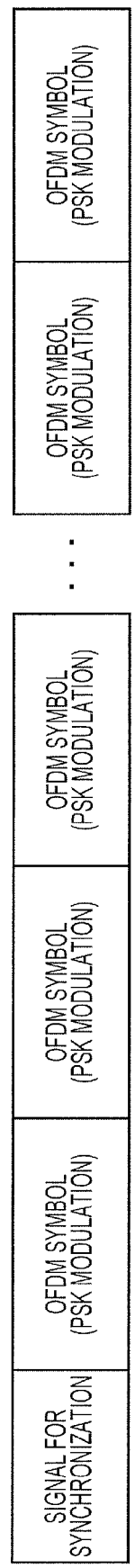
FIG. 2 is a view of a frame configuration according to a first embodiment of the present invention.
Figure 3:
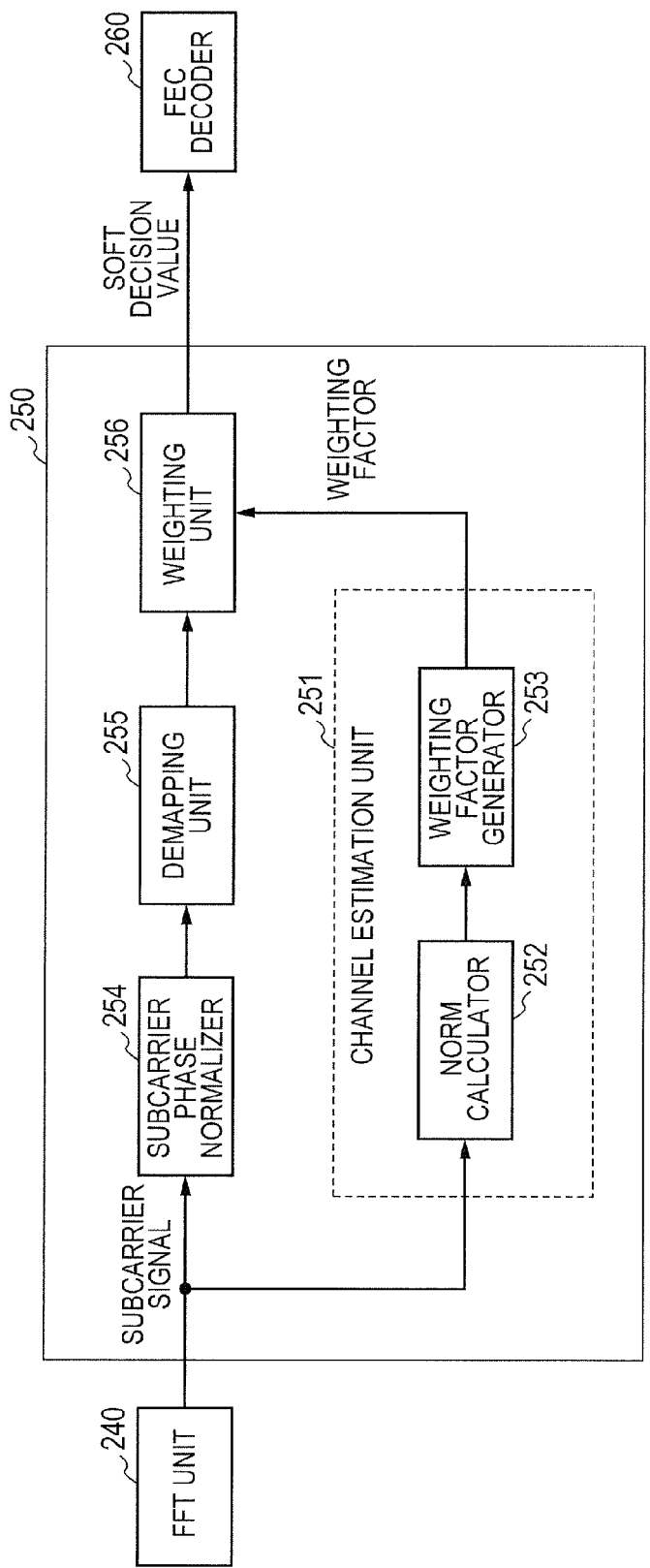
FIG. 3 is a block diagram of a demodulator (demodulation device) according to the first embodiment.

FIG. 2 shows a frame configuration of a signal transmitted from the transmitting device 100. As shown in FIG. 2, a signal for synchronization used as a preamble for synchronous detection is provided at the top of each frame. Then, a predetermined number of OFDM symbols, which are modulated by PSE, are provided.

Next, the configuration of the receiving device 200 will be described. The receiving device 200 includes an analog front end (AFE) unit 210, a synchronizer 220, a cyclic prefix (CP) removal unit 230, a fast Fourier transform (FFT) unit 240, a demodulator 250, and an FEC decoder 260.

The AFE unit 210 receives a signal transmitted from the transmitting device 100 through the power line 10. More specifically, the AFE unit 210 includes a filter, an automatic gain adjuster, and an AD converter. The automatic gain adjuster adjusts the gain with respect to the received signal that is input from the power line 10 and filtered by the filter. Then, the automatic gain adjuster outputs the received signal to the AD converter. The AD converter converts the gain adjusted analog signal into a digital signal. Then, the converted digital signal is output to the synchronizer 220.

The synchronizer 220 detects the top of the frame by synchronizing the digital signal output from the AFE unit 210, with the signal for synchronization. Then, the synchronizer 220 divides the signal in which the top of the frame is detected, into symbol units to obtain OFDM symbols. The synchronized OFDM symbols are output to the CP removal unit 230.

The CP removal unit 230 removes the CP from each OFDM symbol of the signal that is divided into symbol units by the synchronizer 220 through the synchronization process. Hereinafter, all the components including the AFE unit 210, the synchronizer 220, and the CP removal unit 230 are also collectively referred to as the OFDM symbol receiver, which is the receiver for receiving the OFDM symbol that is modulated by PSK.

The FFT unit 240 applies a Fast Fourier Transform (FFT) process to the OFDM symbol in which the CP is removed. Then, the FFT unit 240 converts the time domain signal into a frequency domain signal to obtain a subcarrier signal.

The demodulator 250 obtains a soft decision value by decoding the subcarrier signal obtained by the FET unit 240 through the FFT process.

The FEC decoder 260 decodes the soft decision value obtained by the demodulator 250, based on the algorithm such as the Viterbi decoding method. Then, the FEC decoder 260 extracts the data transmitted from the transmitting device 100 as the received data.

Next, the specific configuration of the demodulator 250 will be described in detail. FIG. 2 is a block diagram of the demodulator 250. The demodulator 250 includes a channel estimation unit 251, a subcarrier phase normalizer 254, a demapping unit 255, and a weighting unit 256. Each subcarrier signal is associated with each subcarrier on the frequency axis that is obtained by the FFT unit 240 through the EFT process. Then, the subcarrier signal is input to the channel estimation unit 251 and to the subcarrier phase normalizer 254.

The channel estimation unit 251 calculates the weighting factor for each subcarrier based on the norm of the subcarrier signal input from the FFT unit 240. Then, the channel estimation unit 251 outputs the result to the weighting unit 256. Here, the norm means the absolute distance from the center point on the complex plane (IQ plane) to the received signal point. More specifically, here, the channel estimation unit 251 includes a norm calculator 252 and a weighting factor generator 253.

The norm calculator 252 calculates the norm of each subcarrier signal input from the FFT unit 240. The norm calculator 252 outputs the calculated norm of each subcarrier signal to the weighting factor generator 253.

The weighting factor generator 253 generates a weighting factor for each subcarrier based on the norm of each subcarrier signal that is input in every symbol timing by the norm calculator 252. Here, the weighting factor is the information used for the weighting process in the weighting unit 256 described below.

More specifically, the weighting factor generator 253 generates the weighting factor for each subcarrier by taking the statistics of the norm of each subcarrier signal over a plurality of symbols. This is because it is difficult to separate noise and signal only by I/Q information of a single symbol, so that the statistics are taken over the symbols in order to separate noise and signal.

Here, PSK is used for the modulation in the transmitting device 100. Thus, the norm calculated for each subcarrier by the norm calculator 252 is ideally constant. Actually, variation of the norm occurs due to the noise generated by the power line 10. The weighting factor generator 253 estimates the noise from the variation of the norm, and reflects the estimated noise in the weighting performed by the weighting unit 256. In other words, the weighting factor generator 253 generates the weighting factor so that the greater the variation of the norm, the smaller the likelihood of the soft decision value obtained by the weighting unit 256.

Here, the reason why the norm statistics are taken for each subcarrier is that the signal power and the noise power are different for each frequency. Thus, the weighting factor generator 253 generates the weighting factor for each subcarrier individually, instead of generating the weighting factor that is common to all the subcarriers.

The subcarrier phase normalizer 254 normalizes the subcarrier signals input from the FFT unit 240. Here, each subcarrier signal is the signal that is modulated by PSK, which does not require normalization of the amplitude. For this reason, the subcarrier phase normalizer 254 normalizes the phase of the individual subcarriers.

After the phase normalization of the individual subcarrier signals, the demapping unit 255 generates a bit string by demapping each subcarrier signal from the constellation.

The weighting unit 256 obtains a soft decision value by weighting the bit string after demapping, based on the weighting factor that is generated by the channel estimation unit 251. More specifically, the weighting unit 256 subtracts the weighting factor corresponding to the norm variation obtained from the norm statistics taken by the weighting factor generator 253, from the bit string after demapping output from the demapping unit 255, in order to weight the particular bit string. Here, the weighting unit 256 weights the bit strings that are generated by demapping the subcarrier signals, for each subcarrier based on the weighting factor corresponding to the particular subcarrier. The soft decision value, which is the weighted code string, is output to the FEC decoder 260. The FEC decoder 260 extracts the received data by decoding the soft decision value input based on the most likelihood decoding such as Viterbi decoding.

As described above, the receiving device according to the first embodiment includes: a receiver for receiving an OFDM symbol that is modulated by phase shift keying; an FFT processor for obtaining a subcarrier signal by applying an FFT process to the received OFDM symbol; and a demodulator for obtaining a soft decision value by demodulating the subcarrier signal. Here, the demodulator includes: a demapping unit for demapping the subcarrier signal; a norm calculator for calculating the norm of the subcarrier signal; a weighting factor generator for generating a weighting factor by taking the statistics of the calculated norm; and a weighting unit for obtaining the soft decision value by weighting the bit string after demapping based on the particular weighting factor. The obtained soft decision value is decoded by the decoder using a predetermined soft decision decoding algorithm. Finally, the data transmitted from the transmitting device is extracted as the received data.

In the power line communication in which the amplitude noise is large, the modulation is performed by mainly using PSK, so that the norm of the ideal signal point is constant. The receiving device according to the first embodiment performs the weighting process by estimating the channel from the variation of the norm, by focusing on the fact that the particular norm is constant. With this configuration, there is no need to use a pilot signal that normalizes the amplitude and phase to obtain the reference symbol point, compared to the case in which the variation is obtained from the reference symbol point. As a result, it is possible to improve the throughput and to reduce the number of processes required to obtain the weighting factor.

It is also possible that the TX data is interleaved and transmitted from the transmitting device 100. In other words, an interleaver is provided between the FEC encoder 110 and the modulator 120, so that the code string output from the FEC encoder 110 is interleaved and output to the modulator 120. In this case, a de-interleaver is provided between the demodulator 250 and the FEC decoder 260 on the side of the receiving device 200, so that the demodulated code string (soft decision value) is de-interleaved back into its original and output to the FEC decoder 260.

Further, a signal processing device may be provided in the receiving device 200 to perform various processes in the FFT unit 240 and the demodulator 250. In such a case, the signal processing device includes: an FFT processor for obtaining a subcarrier signal by applying an FFT process to an OFDM symbol that is modulated by phase sift keying; a demapping unit for demapping the subcarrier signal obtained by the FFT process; a norm calculator for calculating the norm of the subcarrier signal obtained by the FFT process; a weighting factor generator for generating a weighting factor by taking the statistics of the calculated norm; and a weighting unit for weighting the bit string after demapping, based on the particular weighting factor. Further, the signal processing device may also include a decoder for extracting data by decoding the soft decision value that is obtained by the weighting unit through the weighting process using a soft decision decoding method. Here, the functions of the respective components can be achieved in various forms by combinations of hardware and software (program). The signal processing device can be implemented as a semiconductor circuit, and is sometimes referred to as the micro processing unit (MPU).

Second Embodiment

A receiving device according to a second embodiment is designed to generate a weighting factor by calculating the variance of the norm as the variation of the norm. This is described below with reference to the drawings. Note that part of the description of the configuration described in the first embodiment is omitted for clarity of the invention.

Figure 4:
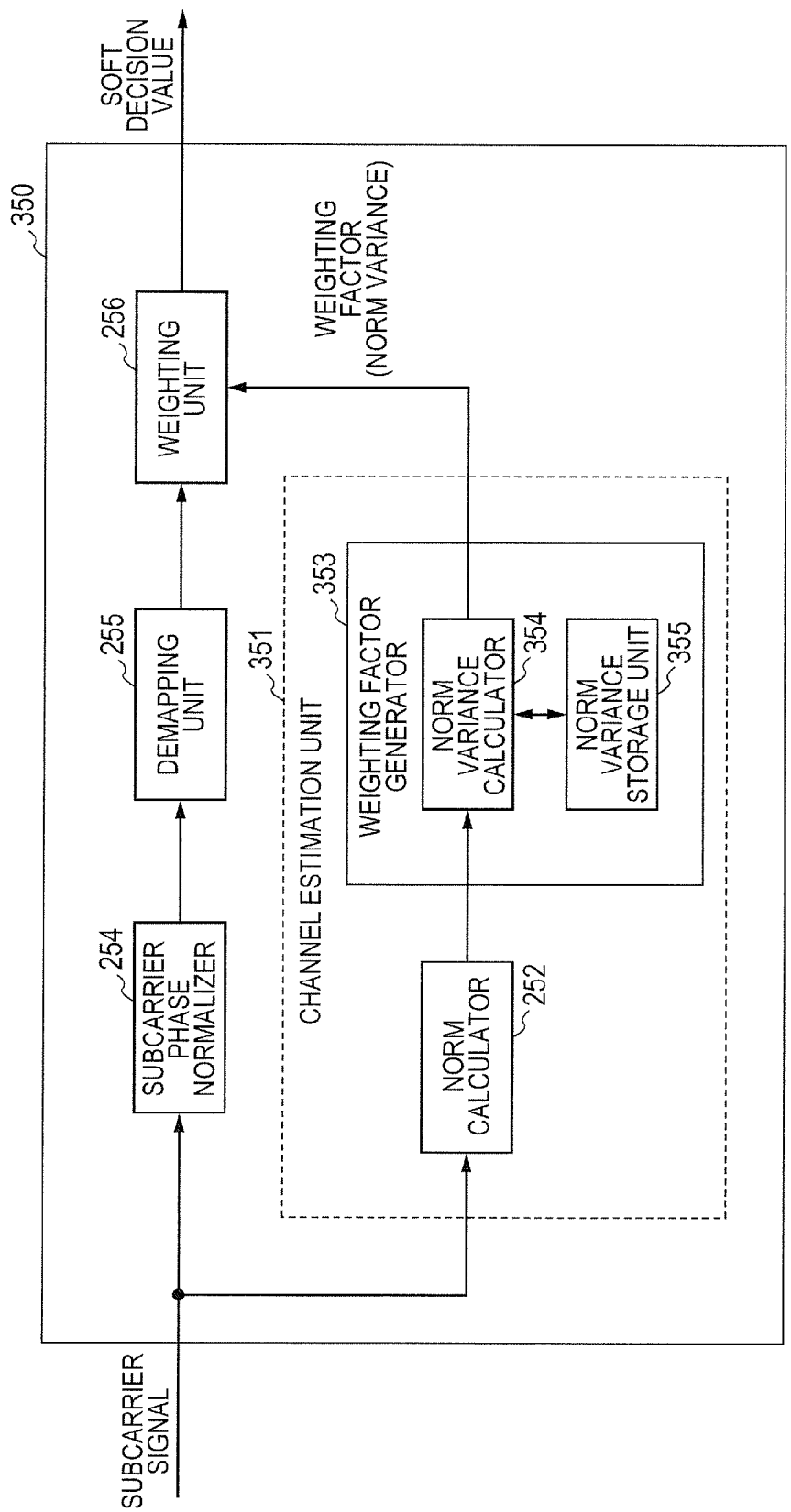
FIG. 4 is a block diagram of a demodulator (demodulation device) according to a second embodiment.

FIG. 4 is a block diagram of a demodulator 350 according to the second embodiment. In the demodulator 350, a weighting factor generator 353 generates a weighting factor based on the norm calculated in a norm calculator 252. The weighting factor generator 353 includes a norm variance calculator 354 and a norm variance storage unit 355.

The norm variance calculator 354 calculates the variance of the norm for each subcarrier output from the norm calculator 252. If $x_k$ is the norm of the subcarrier signal in the k-th symbol in a certain subcarrier, the norm variance calculator 354 calculates the norm variance $\sigma^2$ which is the statistics of the norm from the start to the k-th symbol according to the equation (1). Here, $\mu$ is the expected value of the norm.

$$\sigma^2 = \frac{1}{k}\sum_{i=0}^{k}(|x_i| - \bar{x})^2 = \frac{1}{k}\sum_{i=0}^{k}|x_i|^2 - \bar{x}^2 \qquad \text{[Equation 1]}$$

$$\mu = \frac{1}{k}\sum_{i=0}^{k}|x_i|$$

As shown in the equation (1), the norm variance calculator 354 can obtain the norm variance $\sigma^2$ for each subcarrier by calculating the square of the integrated moving average of the subcarrier signals that are modulated by PSK, and by calculating the integrated moving average of the squares. The norm variance calculator 354 outputs the norm variance $\sigma^2$, which is calculated for each subcarrier as the weighting factor, to the weighting unit 256 and to the norm variance storage unit 355.

The norm variance storage unit 355 stores the norm variance $\sigma^2$ that is calculated by the norm variance calculator 354 for each subcarrier in the k-th symbol, as the statistics of the norm from the start to the k-th symbol.

The norm variance calculator 354 newly calculates a norm variance $\sigma^2$ in the next (k+1)-th symbol, as the statistics of the norm from the start to the (k+1)-th symbol, based on the norm variance $\sigma^2$ in the k-th symbol that is stored in the norm variance storage unit 355, and based on the norm in the (k+1)—the symbol that is newly calculated by the norm calculator 252. Then, similarly to the case of the k-th symbol, the norm variance calculator 354 outputs the result to the weighting unit 256 and to the norm variance storage unit 355. The norm variance storage unit 355 overwrites the stored norm variance $\sigma^2$ in the k-th symbol with the norm variance $\sigma^2$ in the (k+1)-th symbol that is output from the norm variance calculator 354. In this way, the norm variance storage unit 355 updates the norm variance $\sigma^2$.

The weighting unit 256 weights the bit string for each subcarrier input from the demapping unit 255, by dividing by the norm variance $\sigma^2$ of the corresponding subcarrier output from the norm variance calculator 354, namely, by multiplying the inverse number of the norm variance $\sigma^2$. Thus, the weighting unit 256 obtains the soft decision value.

As described above, in the receiving device according to the second embodiment, the demodulator 350 obtains the variance from the norm of the subcarrier signal as the weighting factor. The demodulator 350 weights the bit string after demapping, based on the particular weighting factor to express the likelihood. Then, the FEC decoder 260 applies a soft decision decoding process to the soft decision value, which is the likelihood representing the bit probability that is obtained by the demodulator 350. In this way, the FEC decoder 260 extracts the received data with high accuracy.

Figure 5:
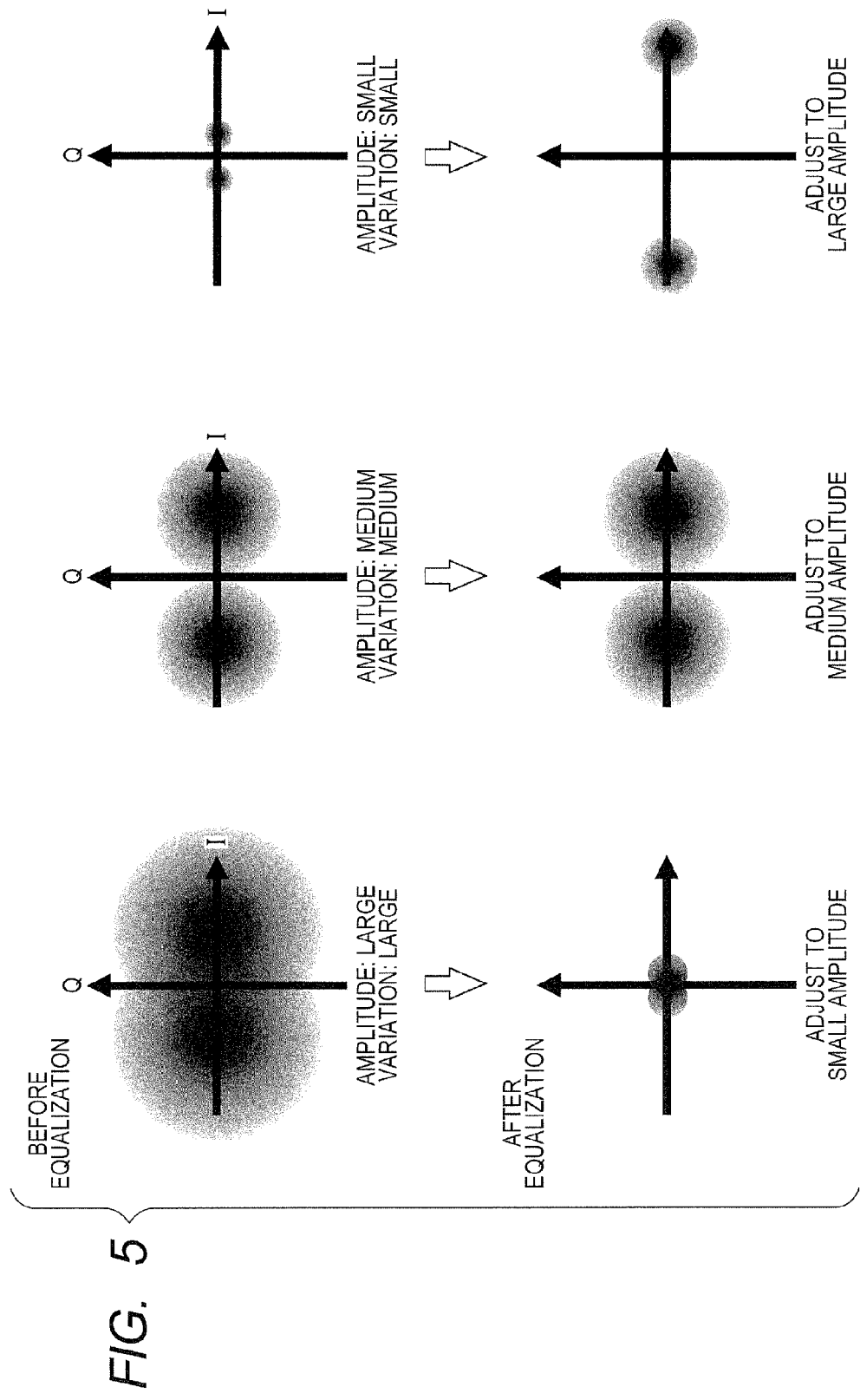
FIG. 5 is a view showing signal point positions before and after equalization process according to the second embodiment.

Here, if the variation of the norm is large, the norm variance $\sigma^2$ increases. FIG. 5 shows examples of the signal that is weighted by diving by the norm variance $\sigma^2$ to be used as the weighting factor. In other words, as shown in FIG. 5 (left), when the noise is large and the norm variance $\sigma^2$ is large, the signal is adjusted to have a small amplitude by the weighting process even if the amplitude is large. On the other hand, as shown in FIG. 5 (right), when the noise is small and the norm variance $\sigma^2$ is small, the signal is adjusted to have a large amplitude even if the amplitude is small. Then, the magnitude of the amplitude adjusted by the weighting process is assigned to the bit probability (likelihood). For example, the magnitude of the amplitude is assigned to a value between −127 and +127. Then, the FEC decoder 260 performs the soft decision decoding process. With this configuration, it is possible to maintain good decoding characteristics while reducing the number of processes.

Here, as described above, the norm variance calculator 354 only performs addition, so that there is no need to have a memory to store all the symbols. In other words, it is enough to have the norm variance storage unit 355 to keep the norm variance $\sigma^2$ obtained for each subcarrier by the calculations described above. It is possible to obtain the norm variance $\sigma^2$ for each subcarrier from the start to the current symbol, by adding the norm newly output from the norm calculator 252 for each subcarrier with respect to the norm variance $\sigma^2$ that is obtained from the start to the previous symbol for each subcarrier, according to the equation (1). Thus, there is no need to have a memory with a large capacity, and it is possible to sequentially obtain the norm variances $\sigma^2$ by a simple calculation in real time. The variances sequentially obtained and updated as described above are converged, because the number of samples increases as the number of symbols to be processed increases. Thus, it is possible to estimate the noise with high accuracy as time passes.

Note that in the above description, the norm variance $\sigma^2$ is obtained as the norm variation for the calculation based on the electricity standard, and is used as the weighting factor. However, when the calculation is performed based on the amplitude standard, it is possible to use the standard deviation $\sigma$ as the weighting factor. In other words, the norm variance calculator 354 takes the square root of the calculated variance $\sigma^2$ to obtain the standard deviation $\sigma$ as the norm variation. Then, the norm variance calculator 354 outputs the particular standard deviation $\sigma$ to the weighting unit 256 as the weighting factor. In this case, the norm variance calculator 354 may also be referred to as the norm standard deviation calculator.

Third Embodiment

Figure 6:
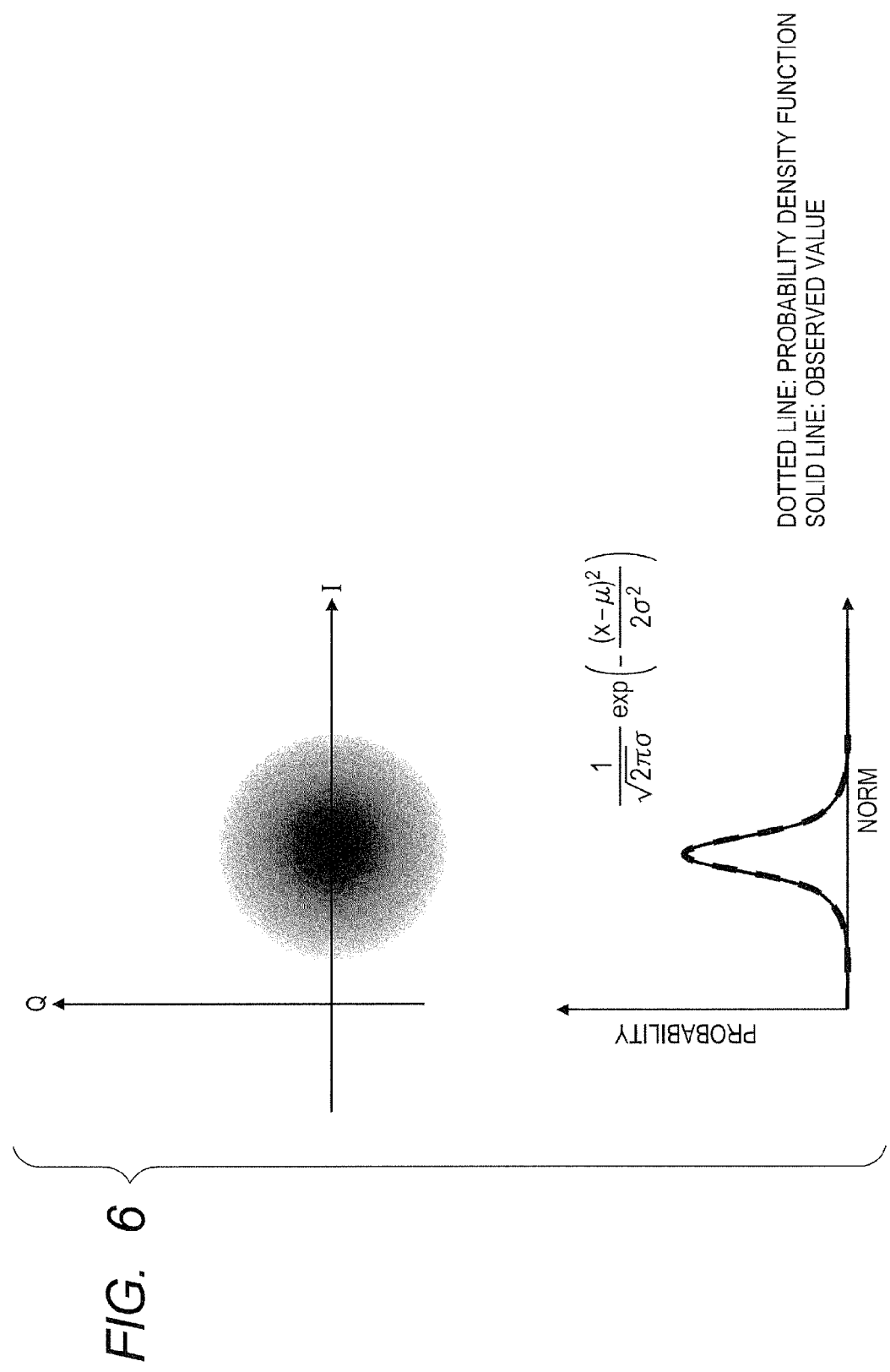
FIG. 6 is a view of the signal point distribution when the noise is small on the complex plane.

In the second embodiment described above, the variance calculated based on the norm of each subcarrier is used as the weighting factor for weighting. This is because, as shown in FIG. 6, when the expected value $\mu$ of the norm is sufficiently large compared to $\sigma$, namely, the SN is sufficiently large, it can be approximated as $\mu^2$ signal power, $\sigma^2$ noise power.

Figure 7:
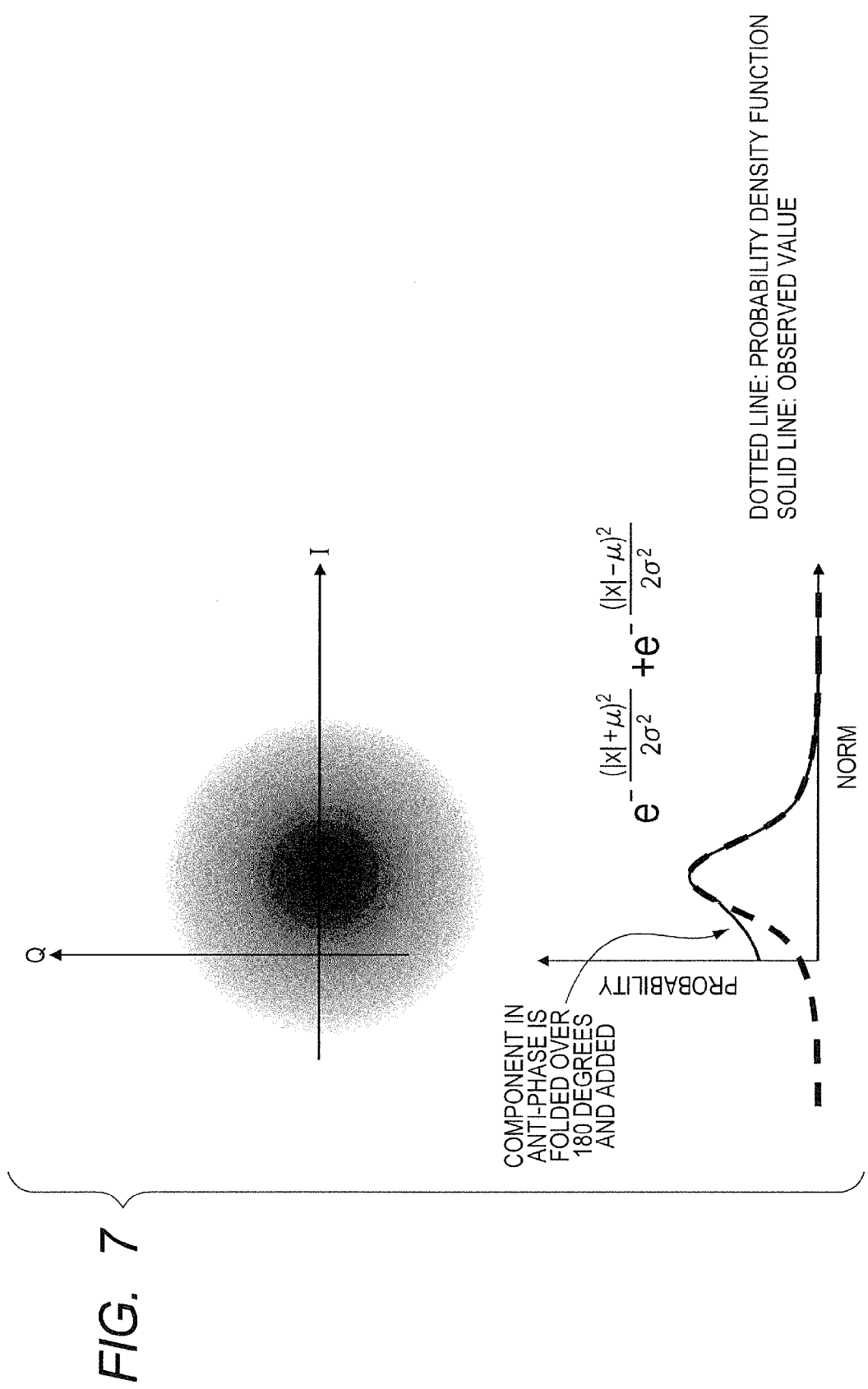
FIG. 7 is a view of the signal point distribution when the noise is large on the complex plane.

However, when the expected value is close to $\sigma$, namely, when the SN is not taken, the approximation of the $\sigma^2$ noise power is not largely deviated but the approximation of the $\mu^2$ signal power is not true. This is because, as shown in FIG. 7, when the noise N is large, the ratio of the element of the phase folded over 180 degrees and added increases. This contribution is not negligible, and as a result, there is a difference between the observed value and the probability density function.

Thus, the receiving device according to the third embodiment of the present invention is designed to estimate the signal noise ratio (SNR) based on the norm variation, and generate the weighting factor so that the estimated SNR is reflected in the soft decision value. This will be described below with reference to the drawings. Note that part of the description of the configuration described in the first and second embodiments is omitted for clarity of the invention.

Figure 8:
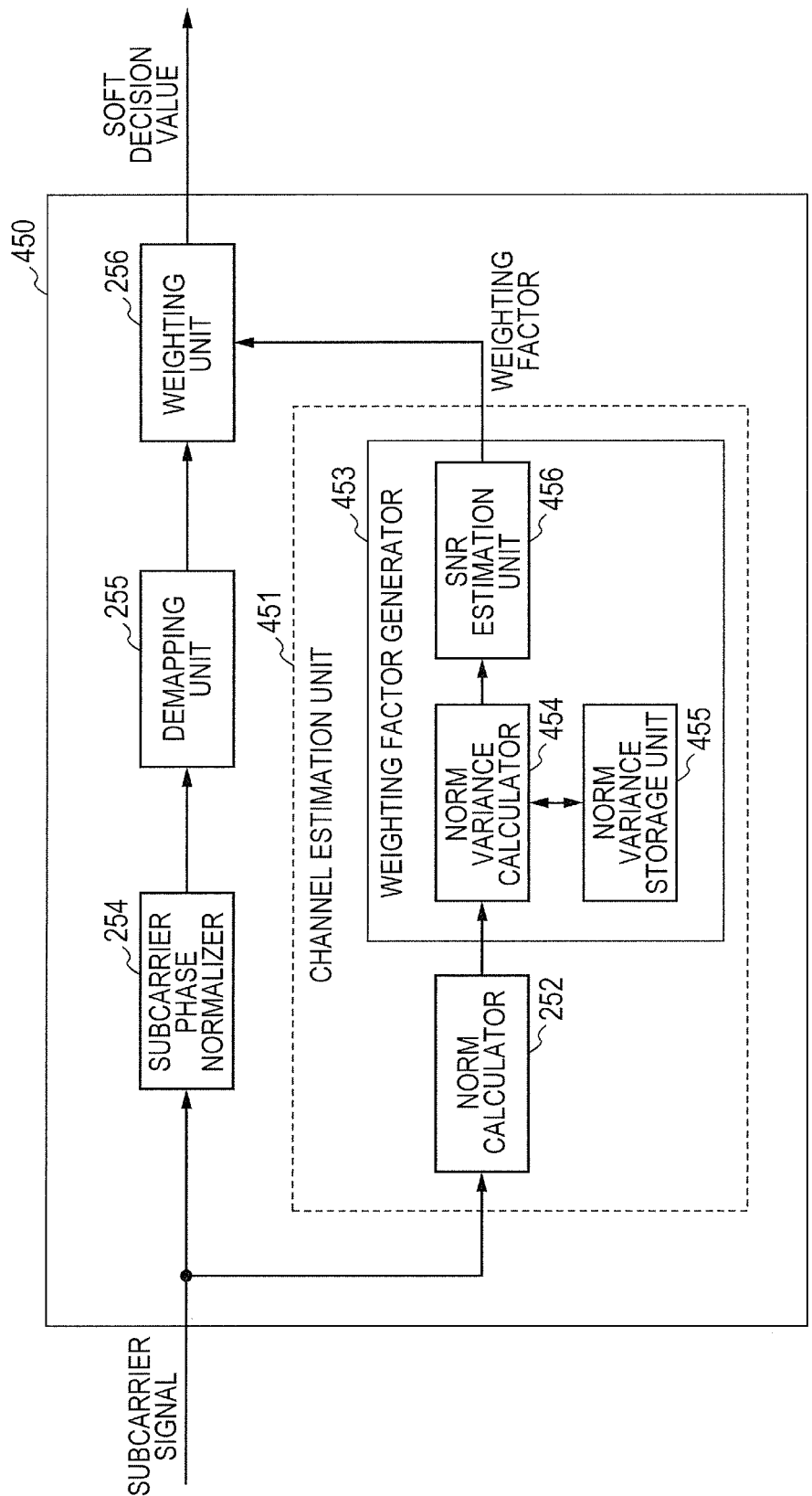
FIG. 8 is a block diagram of a demodulator (demodulation device) according to a third embodiment.

FIG. 8 is a block diagram of a demodulator 450 according to the third embodiment. In the demodulator 450, a weighting factor generator 453 for generating a weighting factor includes a norm variance calculator 454, a norm variance storage unit 455, and a signal noise ratio (SNR) estimation unit 456.

The norm variance calculator 454 calculates the norm variance $\sigma^2$ and the norm expected value $\mu$ (or $\mu^2$, which is the square of the norm expected value based on the norm output from the norm calculator 252 for each subcarrier, according to the equation (1).

The norm variance storage unit 455 keeps the norm variance $\sigma^2$ that is calculated by the norm variance calculator 454 in the k-th symbol as the statistics of the norm from the start to the k-th symbol, as well as the norm expected value $\mu$ for each subcarrier. The norm variance calculator 454 adds a new norm output from the norm calculator 252, to the norm variance $\sigma^2$ calculated as the statistics of the norm from the start to the current symbol, as well as the norm expected value $\mu$, which are stored in the norm variance storage unit 455, according to the equation (1). Thus, the norm variance calculator 454 obtains the norm variance $\sigma^2$ as the statistics of the norm from the start to the current symbol, as well as the norm expected value $\mu$ for each subcarrier.

The SNR estimation unit 456 estimates the SNR based on the norm variance $\sigma^2$ and the norm expected value $\mu$ that are calculated by the norm variance calculator 454. Here, as described above, the noise power $P_{noise}$ can be approximated by $\sigma^2$. However, the signal power $P_{signal}$ may not be approximated by $\mu^2$ and is expressed by a function f of $\sigma$ and $\mu$. Here, it is difficult to derive an exact analytical solution for $P_{signal}$. However, $P_{signal}$ can be given in one variable table by normalization. Thus, the SNR estimation unit 456 corrects $\mu^2$ based on the particular correction table to obtain S. Then, the SNR estimation unit 456 calculates the weighting factor by taking into account the corrected S.

$$P_{noise} = \sigma^2$$

$$P_{signal} = f(\sigma, \mu) = \mu^2 \cdot g(\mu^2/\sigma^2)$$

$$SNR = P_{signal}/P_{noise} \qquad \text{[Equation 2]}$$

Figure 9:
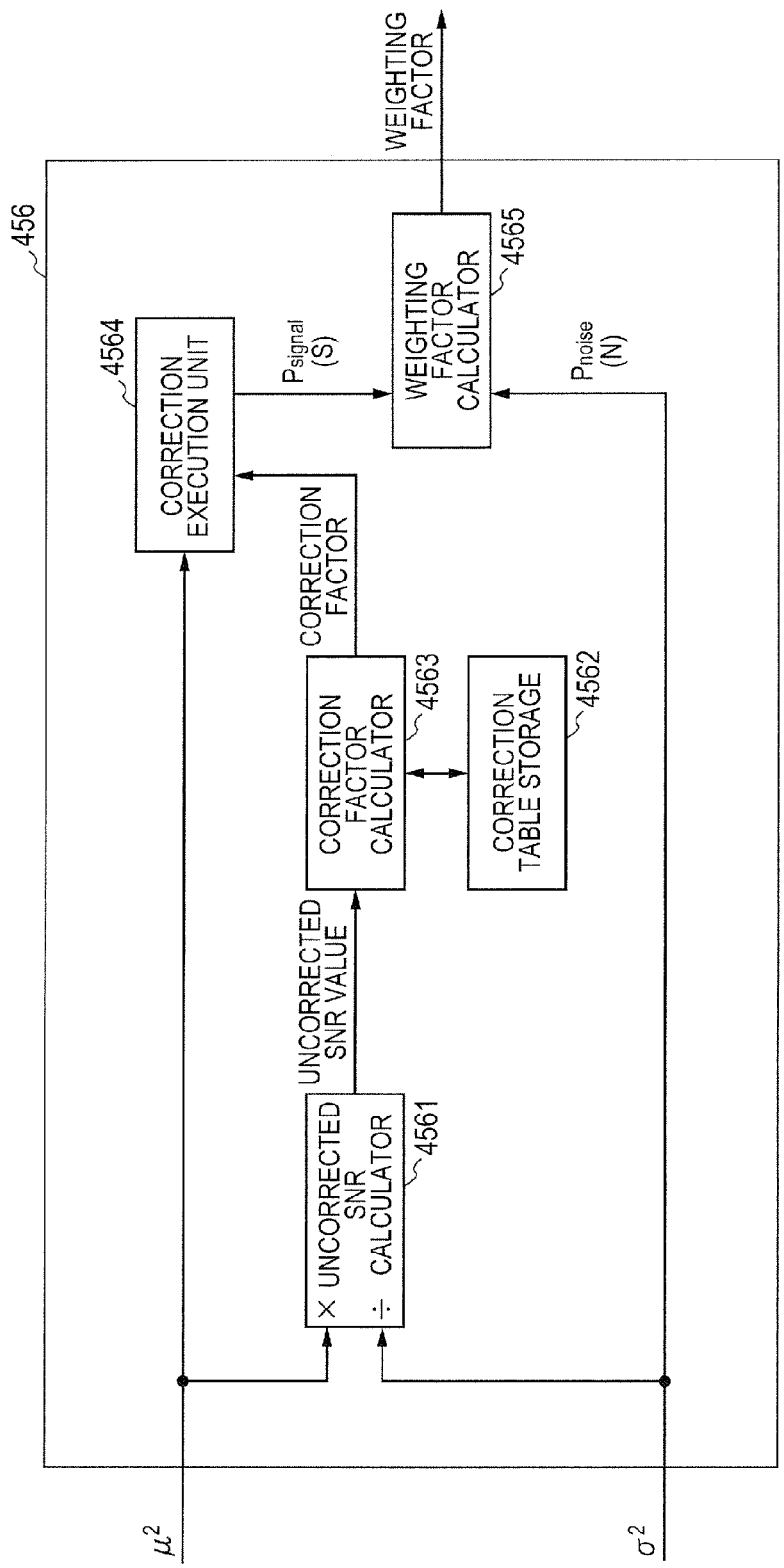
FIG. 9 is a block diagram showing a specific configuration of an SNR estimation unit according to the third embodiment.

FIG. 9 is a block diagram showing a specific configuration of the SNR estimation unit 456. The SNR estimation unit 456 includes an uncorrected SNR calculator 4561, a correction table storage 4562, a corrected factor calculator 4563, a correction execution unit 4564, and a weighting factor calculator 4565.

The uncorrected SNR calculator 4561 calculates the uncorrected SNR by subtracting $\sigma^2$ from $\mu^2$ representing the temporary signal power input from the norm variance calculator 454. Then, the uncorrected SNR calculator 4561 outputs the result to the correction factor calculator 4563.

The correction table storage 4562 stores the correction table of the relationship between values of the uncorrected SNR ($\mu^2/\sigma^2$) and the correction factor.

The correction factor calculator 4563 refers to the correction table stored in the correction table storage 4562 to obtain the correction factor ($\mu^2/\sigma^2$) corresponding to the uncorrected SNR input from the uncorrected SNR calculator 4561. Then, the correction factor calculator 4563 outputs the result to the correction execution unit 4564.

The correction execution unit 4564 obtains $P_{signal}$ shown in the equation (2), by multiplying the input correction factor obtained by the correction factor calculator 4563, to $\mu^2$ which is the temporary signal power. Then, the correction execution unit 4564 outputs the result to the weighting factor calculator 4565.

The weighting factor calculator 4565 obtains the weighting factor so that the SNR is reflected in the soft decision value that has been weighted by the weighting unit 256, based on the norm variance $\sigma^2$ that is the $P_{noise}$ just input from the norm variance calculator 454, and based on the $P_{signal}$ obtained by the correction execution unit 4564. The weighting factor calculator 4565 outputs the weighting factor obtained based on the $P_{noise}$ and $P_{signal}$ as described above, to the weighting unit 256.

Note that the uncorrected SNR, correction factor, $P_{noise}$, $P_{signal}$, and weighting factor are obtained for each subcarrier by the respective components of the SNR estimation unit 456.

The weighting unit 256 obtains the soft decision value by weighting the bit strings that are generated by demapping the subcarrier signals, based on the weighting factor for each subcarrier input from the SNR estimation unit 456. Then, the weighting unit 256 outputs the soft decision value to the FEC decoder 260. At this time, the soft decision value input to the FEC decoder 260 reflects the SNR more appropriately. Thus, it is possible to perform soft-decision decoding with high decoding performance.

Note that in the above description, the norm variance calculator 454 obtains $\mu^2$ and outputs to the SNR estimation unit 456. However, the present invention is not limited to this configuration. It is also possible to configure the norm variance calculator 454 to obtain the norm expected value $\mu$ and output to the SNR estimation unit 456. In this case, the SNR estimation unit 456 obtains $\mu^2$ by squaring the input norm expected value $\mu$. Then, the SNR estimation unit 456 calculates the uncorrected SNR and $P_{signal}$. The difference is only in that the function of squaring the norm expected value $\mu$ belongs to the norm variance calculator 454 or to the SNR estimation unit 456. In both cases, the SNR estimation unit 456 estimates the SNR based on the norm variance $\sigma^2$ and on the norm expected value $\mu$.

As described above, the receiving device according to this embodiment equalizes the amplitude so that the amplitude corresponds to the probability (SNR) for each subcarrier. More specifically, the receiving device further includes the SNR estimation unit for estimating the SNR based on the norm variance $\sigma^2$ and on the norm expected value $\mu$. The SNR estimation unit obtains a weighting factor so that the SNR is appropriately reflected in the soft decision value, and outputs the weighting factor to the weighting unit. Thus, in particular, even if the SNR is poor, it is possible for the weighting unit 256 to obtain a soft decision value to allow accurate decoding, compared to the case in which the norm variance $\sigma^2$ obtained by the norm variance calculator 454 is just used as the weighting factor.

Figure 10:
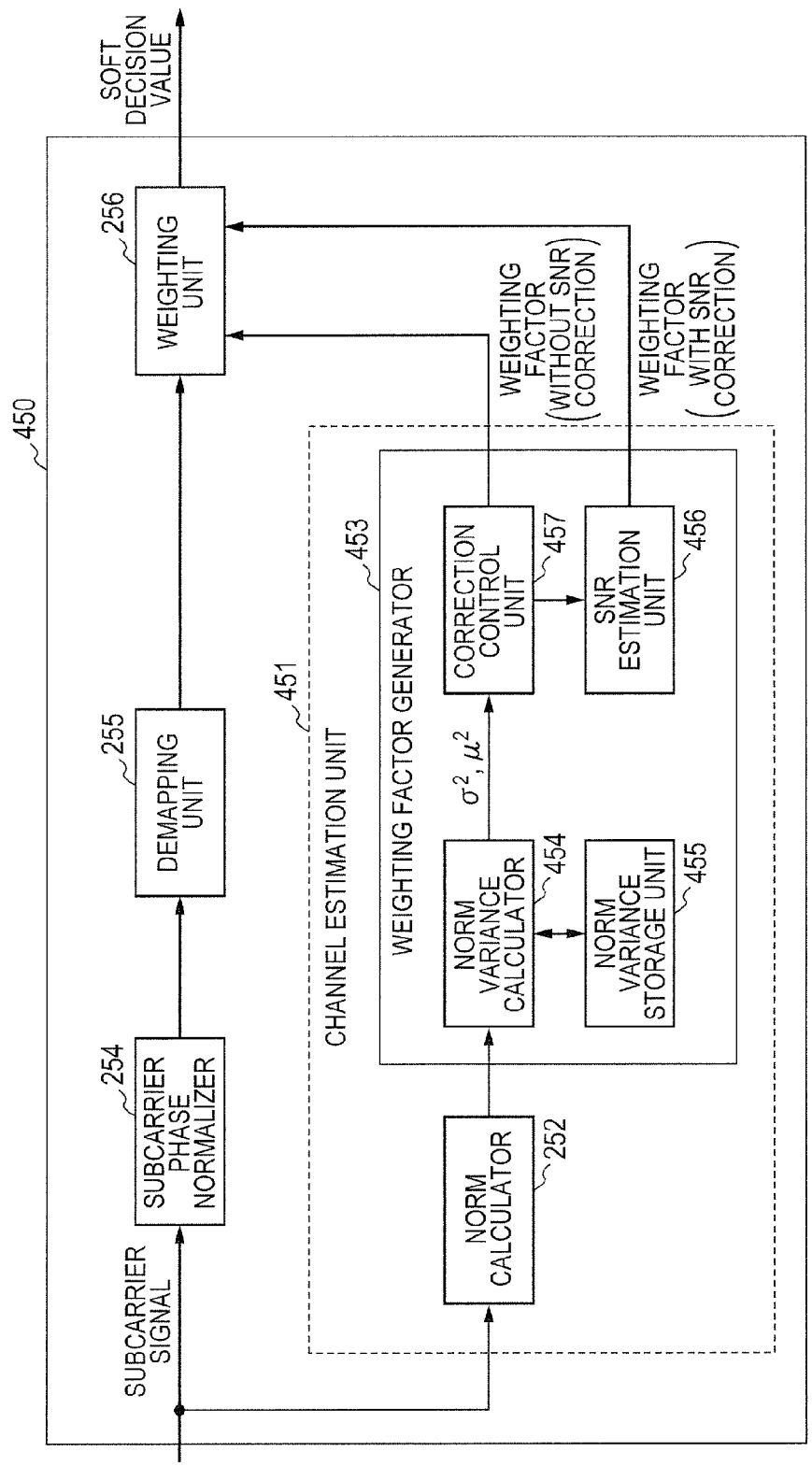
FIG. 10 is a block diagram showing another configuration of the demodulator (demodulation device) according to the third embodiment.

Note that the weighting factor generator 453 may also include a correction control unit 457 as shown in FIG. 10. The correction control unit 457 determines whether the correction of the weighting factor is necessary based on the expected value $\mu$ input from the norm variance calculator 454. More specifically, when the norm expected value $\mu$ or the value of $\mu^2$ is sufficiently large, or when the norm variance $\sigma^2$ is sufficiently small, the correction control unit 457 determines that $SNR=P_{signal}/P_{noise}$ can be approximated by $\mu^2/\sigma^2$. Then, the correction control unit 457 outputs the norm variance $\sigma^2$ calculated by the norm variance calculator 454, to the weighting unit 256 as the weighting factor. On the other hand, when the norm expected value $\mu$ or the value of $\mu^2$ is larger than a predetermined reference value, or when the norm variance $\sigma^2$ is smaller than a predetermined reference value, the correction control unit 457 determines that the signal power $P_{signal}$ may not be approximated by $\mu^2$. Consequently, the correction control unit 457 determines that even if the weighting is performed based on the norm variance $\sigma^2$ as the weighting factor, the SNR is not appropriately reflected in the soft decision value. Thus, the correction control unit 457 outputs the expected value $\mu$ and the variance $\sigma^2$, which are input from the norm variance calculator 454, to the SNR estimation unit 456. The SNR estimation unit 456 estimates the SNR based on the variance $\sigma^2$ and the norm expected value $\mu$ that are input from the correction control unit 457. Then, the SNR estimation unit 456 calculates the weighting factor and inputs the calculated weighting factor to the weighting unit 256. With this configuration, the SNR estimation is not allowed to be performed when $P_{signal}$ can be sufficiently approximated. As a result, the number of processes can be reduced.

Fourth Embodiment

Figure 11:
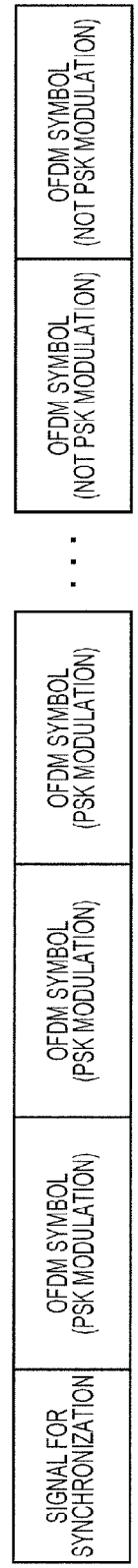
FIG. 11 is a view of a frame configuration according to a fourth embodiment.

In the first to third embodiments, the modulation in the transmitting device 100 is limited to PSK. However, in order to increase the throughput, as shown in FIG. 11, it can be assumed that the modulation is performed by a multilevel modulation method in which some of the symbols constituting one frame are modulated in an amplitude component such as 16 QAM. In this case, the norm in a particular symbol is not constant. Thus, if the channel is estimated using the norm of the signal received with such a symbol, the weighting may not be correctly performed. Thus, in the receiving device according to the fourth embodiment, it is designed to appropriately estimate the channel also when receiving the symbol that is modulated by a modulation method other than PSK. This will be described below with reference to the drawings. Note that part of the description of the configuration described in the first to third embodiments is omitted for clarity of the invention.

Figure 12:
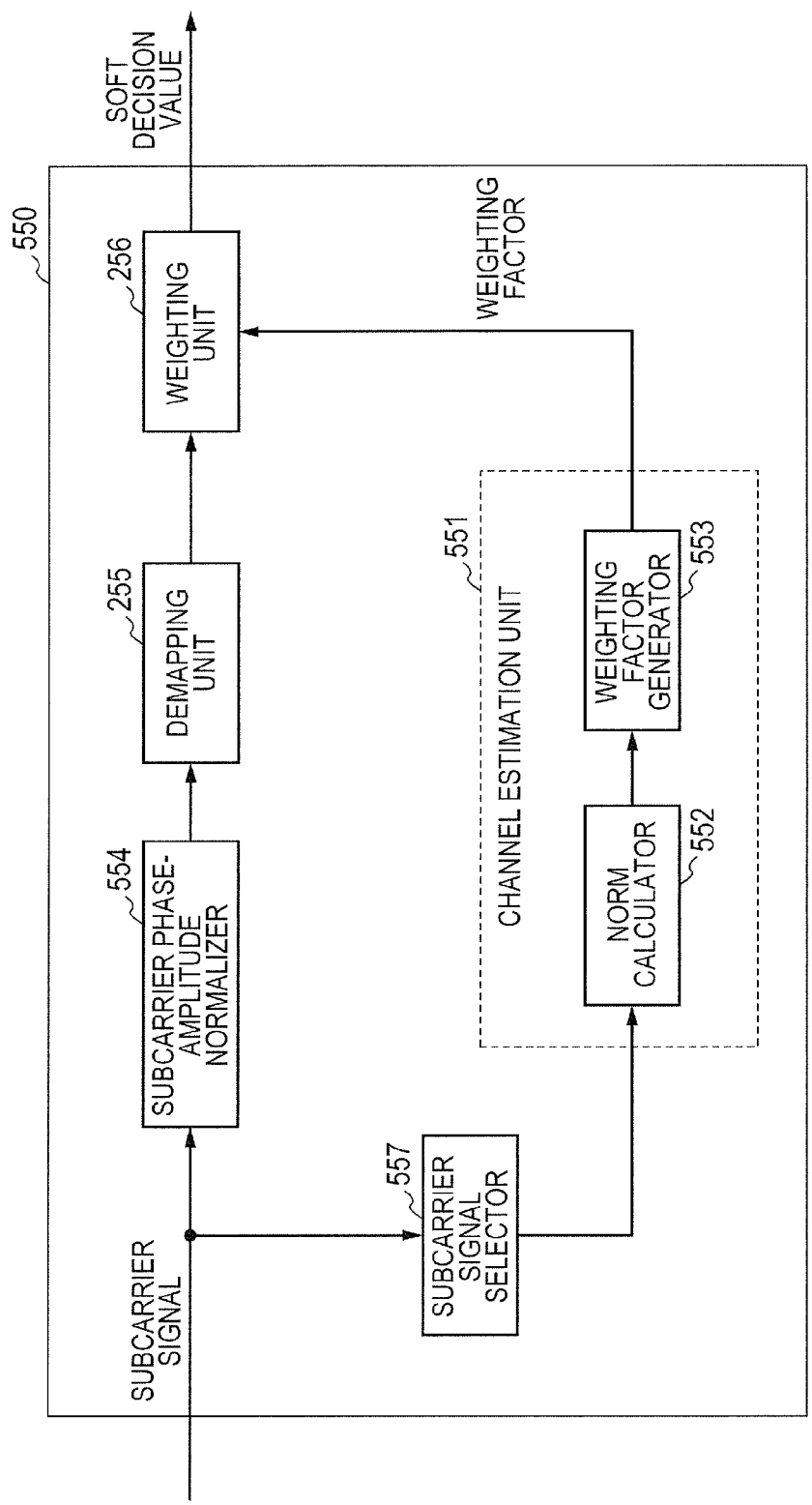
FIG. 12 is a block diagram of a demodulator (demodulation device) according to the fourth embodiment.

FIG. 12 is a block diagram of a demodulator 550 according to a fourth embodiment. The demodulator 550 newly includes a subcarrier signal selector 557.

The subcarrier signal selector 557 receives subcarrier signals that are input at respective symbol timings, and allows a subcarrier signal that is modulated by PSK to pass through a norm calculator 552, while blocking a subcarrier signal that is modulated by a modulation method other than PSK. The modulation method by which each symbol is modulated in one frame is selected in the control information that is transmitted from the transmitting device 100 and received by its own device. Thus, the subcarrier signal selector 557 identifies the subcarrier signal to be blocked based on the particular control information.

The norm calculator 552 calculates the norm with respect to the subcarrier signal that the subcarrier signal selector 557 allows to pass through. Then, the norm calculator 552 outputs the result to a weighting factor generator 553.

The weighting factor generator 553 takes the norm statistics for each subcarrier with respect to the norm calculated by the norm calculator 552 for each subcarrier. In this way, the weighting factor generator 553 generates the weighting factor by taking into account all symbols including the current one, and outputs the weighting factor to the weighting unit 256. Here, the norm of the subcarrier signal blocked by the subcarrier signal selector 557 is not calculated by the norm calculator 552. Thus, the weighting factor generator 553 holds the weighting factor in the previous symbol, instead of calculating a new weighting factor for the particular subcarrier. Then, the weighting factor generator 553 outputs again the weighting factor in the previous symbol to the weighting unit 256.

A subcarrier phase-amplitude normalizer 554 normalizes the input subcarrier signal. Here, the subcarrier phase-amplitude normalizer 554 normalizes both the phase and amplitude of the subcarrier that is modulated by a modulation method other than PSK. Then, the subcarrier phase-amplitude normalizer 554 outputs the result to the demapping unit 255.

The weighting unit 256 weights the bit string generated by demapping the subcarrier signal that is modulated by the modulation method other than PSK, by using the existing weighting factor that has been generated based on the norm of the subcarrier signal that is modulated by the modulation method of PSK.

As described above, the receiving device according to the fourth embodiment further includes a selector for selecting the subcarrier signal that is modulated by the phase shift keying, from the subcarrier signals obtained by the FFT unit through the FFT process, and outputting the subcarrier signal to the norm calculator. The selector allows the subcarrier signal in the symbol that is modulated by the phase shift keying to pass through the norm calculator, while blocking the subcarrier signal in the symbol that is modulated by the modulation method other than the phase shift keying. With this configuration, it is possible to perform appropriate weighting, without reducing the channel estimation accuracy even if different modulation methods exist.

Here, as shown in FIG. 11, if there is a difference in whether the subcarrier signal is modulated by the phase shift keying in the symbol unit, the selector can choose between whether to allow the subcarrier signal to pass through the norm calculator and whether to block the subcarrier signal in the symbol unit. In other words, the selector can select a subcarrier signal obtained by applying the FFT process to the OFDM symbols in which each subcarrier is modulated by the phase shift keying, and output the selected subcarrier signal to the norm calculator. In this case, the selector blocks the subcarrier signal obtained by applying the FFT process to the OFDM symbol in which each subcarrier is modulated by the modulation method other than the phase shift keying. Then, the selector does not output the subcarrier signal to the norm calculator. With this configuration, it is possible to appropriately choose whether to calculate the norm and update the weighting factor in the symbol unit.

Figure 13:
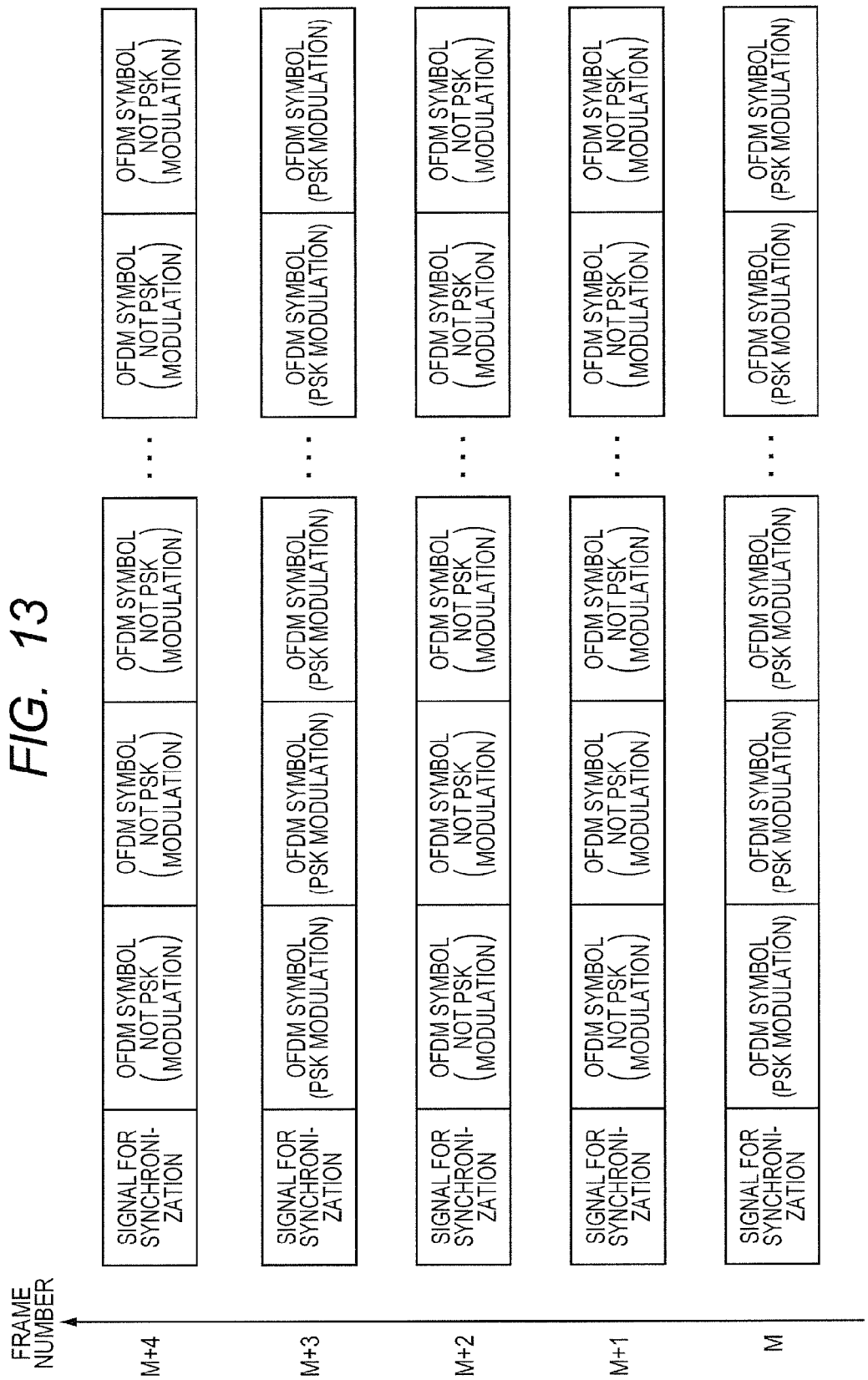
FIG. 13 is a view of another frame configuration according to the fourth embodiment.

Note that, as shown in FIG. 13, if there is a difference in whether the subcarrier signal is modulated by the phase shift keying or the modulation method other than the phase shift keying in the frame unit, the selector can choose between whether to allow the subcarrier signal to pass through the norm calculator and whether to block the subcarrier in the frame unit. In other words, the selector can select a subcarrier signal obtained by applying the FFT process to the OFDM symbols constituting the frame in which each subcarrier is modulated by the phase shift keying, and output the subcarrier signal to the norm calculator. In this case, the selector blocks the subcarrier signal obtained by applying the FFT process to the OFDM symbols constituting the frame in which each subcarrier is modulated by the modulation method other than the phase shift keying. Thus, the selector does not output the particular subcarrier signal to the norm calculator. With this configuration, it is possible to choose whether to calculate the norm and update the weighting factor in the frame unit.

In the case of power line communication, the coupling location between the same communication devices does not significantly vary, which is different from mobile devices. For this reason, the transmission characteristics may be considered to be constant. Thus, if the communication partner can be identified, it is possible to configure that at least a first one of a plurality of frames includes symbols modulated by PSK and the following frame includes symbols modulated by a modulation method other than PSK. In this case, in the following frame, it is possible to perform weighting by using the existing weighting factor that has been obtained by taking the statistics of the norm. As a result, it is possible to increase the throughput without requiring complicated processes.

Note that the statistics of the norm calculated by the weighting factor generator 553 can be the norm variance or the norm standard deviation as described above, or other statistics on the norm.

Fifth Embodiment

As described in the first to fourth embodiments, the weighting factor generator generates the weighting factor by taking the norm statistics for each subcarrier over a plurality of symbols. Here, in general, when the norm statistics are taken over a long symbol interval, the number of samples increases and the effect of convergence effect can be expected. As a result, it is possible to obtain more appropriate weighting factor.

However, the transmission characteristics may modestly change with time in the power line communication. In such circumstances, if the past symbol is used more than necessary in the norm statistics, the modest time change may be reflected in the norm statistics, leading to the degradation of decoding characteristics. Thus, the receiving device according to the fifth embodiment is designed to be able to accurately perform the soft decision, also in the case in which the transmission characteristics modestly change with time. This will be described below with reference to the drawings. Note that part of the description of the configuration described in the first to fourth embodiments is omitted for clarity of the invention.

Figure 14:
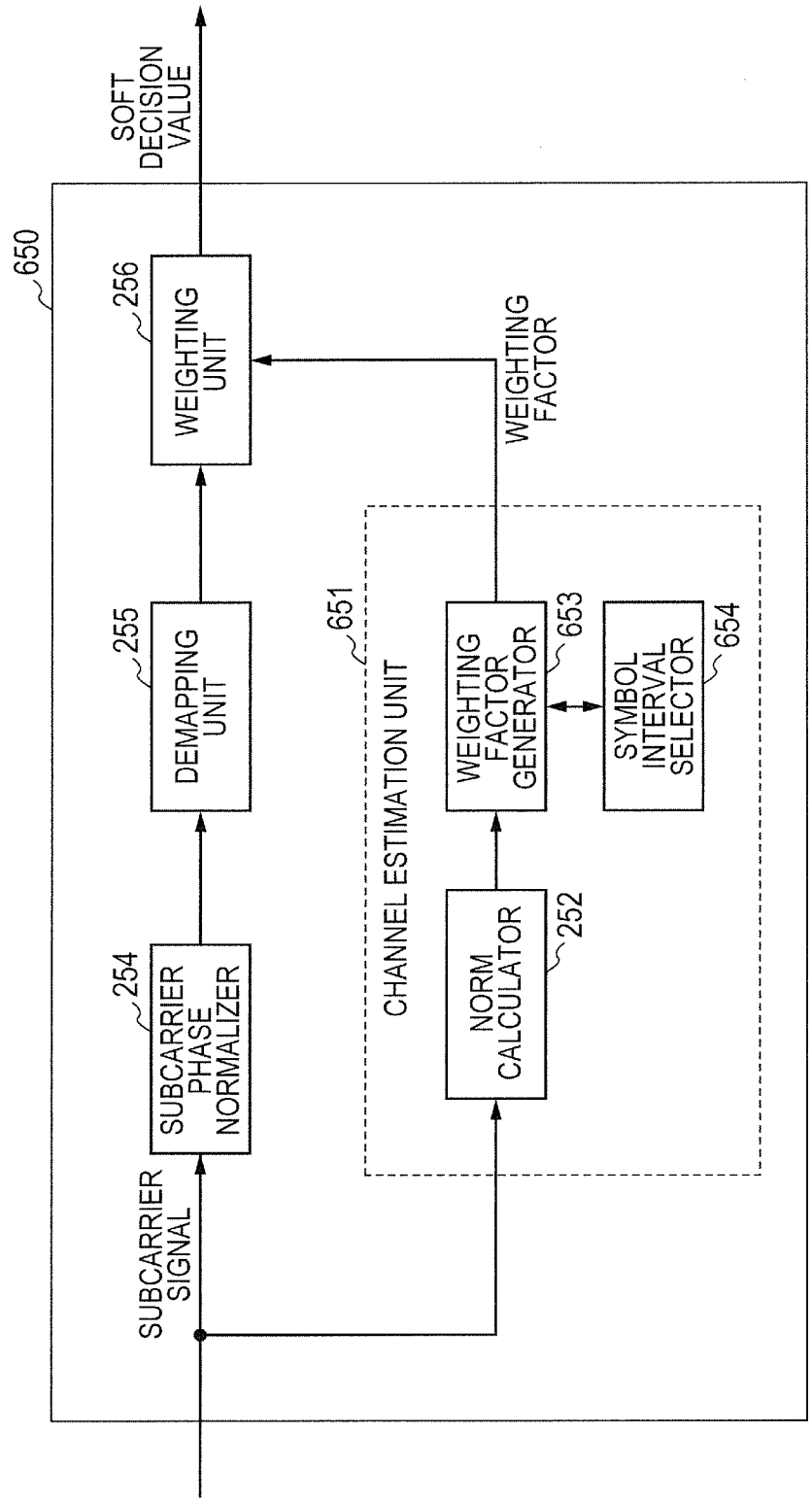
FIG. 14 is a block diagram of a demodulator (demodulation device) according to a fifth embodiment.

FIG. 14 is a block diagram of a demodulator according to the fifth embodiment. A demodulator 650 newly includes a symbol interval selector 654.

The symbol interval selector 654 specifies the number of symbols over which the statistics should be taken in the norm statistics by a weighting factor generator 653. In other words, the symbol interval selector 654 specifies the number of samples required for the norm statistics. For example, the symbol interval selector 654 refers to the difference between the past norm statistics obtained by the weighting factor generator 653, and the norm statistics for a small number of the latest symbols (symbol interval). In this way, the symbol interval selector 654 determines whether the transmission characteristics modestly change as time passes.

Figure 15:
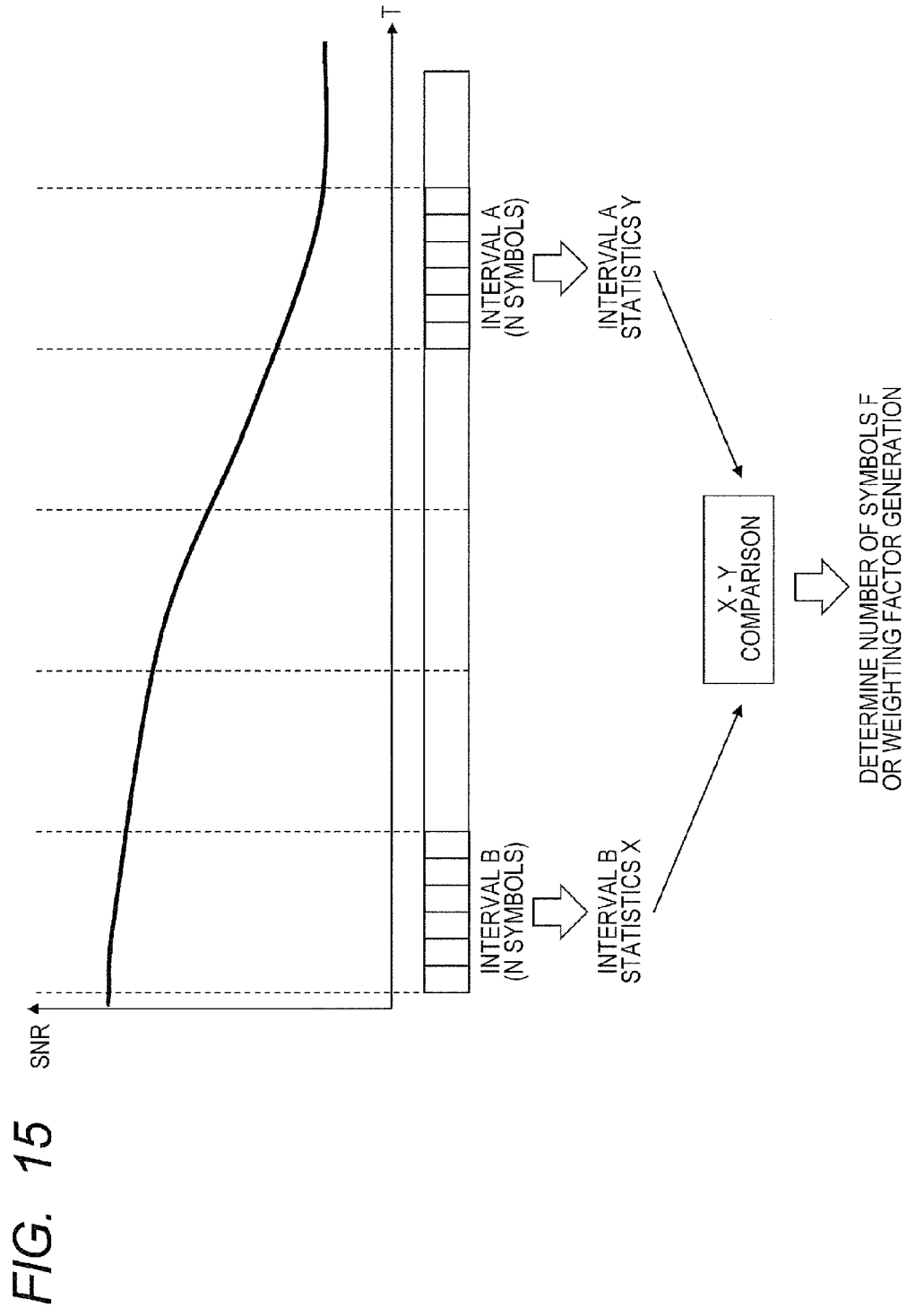
FIG. 15 is a view of the time fluctuation of the SNR in the received OFDM symbols.

An example of the determination method will be described with reference to FIG. 15. Here, it is assumed that the SNR modestly changes with time as shown in FIG. 15. The symbol interval selector 654 determines whether the SNR modestly changes with time, by comparing the norm statistics obtained for the symbols in the past interval B to the norm statistics obtained for the latest symbols in the interval A. The symbol interval selector 654 determines the symbol interval (the number of symbols) used for generating the weighting factor.

Then, the symbol interval selector 654 outputs the result to the weighting factor generator 653.

The weighting factor generator 653 generates a weighting factor by taking the norm statistics for the symbol interval (the number of symbols) selected by the symbol interval selector 654. Then, the weighting factor generator 653 outputs the result to the weighting unit 256.

As described above, the receiving device according to the fifth embodiment also includes the symbol interval selector 654 for selecting the symbol interval (the number of symbols) in which the weighting factor generator 653 takes the statistics of the norm. The weighting factor generator 653 generates the weighting factor by taking the statistics of the norm calculated by the norm calculator 252 over the symbol interval selected by the symbol interval selector 654. With this configuration, the receiving device takes the norm statistics for a small number of latest symbols, independently of the past information when the SNR changes as a whole with time. Thus, in such circumstances, it is also possible to obtain the soft decision value that accurately reflects the current SNR.

Here, as described above, the symbol interval selector 654 can determine the symbol interval to be selected by comparing the results of the norm statistics obtained for a plurality of symbol intervals. In other words, the weighting factor generator 653 outputs the statistics obtained by taking the norm statistics for the symbol intervals, to the symbol interval selector 654, separately from the weighting factor that is generated based on the norm statistics. The symbol interval selector 654 estimates how the SNR changes with time by comparing the statistical values obtained as described above. Then, the symbol interval selector 654 determines the symbol interval required for the calculation of the weighting factor.

For example, if the difference between the past statistics and the current statistics is within a predetermined reference value, the symbol interval selector 654 determines that the modest time change in the SNR is small. In this case, the symbol interval selector 654 determines that the weighting factor can be generated more appropriately by increasing the number of samples to increase the convergence effect. Thus, the symbol interval selector 654 sets a long symbol interval. On the other hand, when the difference between the past statistics and the current statistics is greater than the predetermined reference value, the symbol interval selector 654 determines that the modest time change in the SNR is large. In this case, if the long symbol interval is set as the symbol interval for the norm statistics, the modest time change is reflected in the weighting factor. Thus, the symbol interval selector 654 sets a short symbol interval.

Sixth Embodiment

In the receiving device according to Japanese Unexamined Patent Publication No. 2008-131364, an EVN calculator takes the statistics of the variation from the reference symbol point in some of the latest symbols, for each subcarrier to perform the weighting process. Here, in the power line communication for communicating through a power line, noise is generated depending on the phase of the commercial power supply (AC power supply). Thus, noise with predetermined correlation is generated for each cycle of the AC power supply. In the receiving device according to the related art, no consideration has been given to the noise correlation due to the power line phase. For this reason, the sixth embodiment is designed to perform the weighting by obtaining the weighting factor with the noise depending on the power line phase being taken into account. This will be described below with reference to the drawings. Note that part of the description of the configuration described in the first to fifth embodiments is omitted for clarity of the invention.

Figure 16:
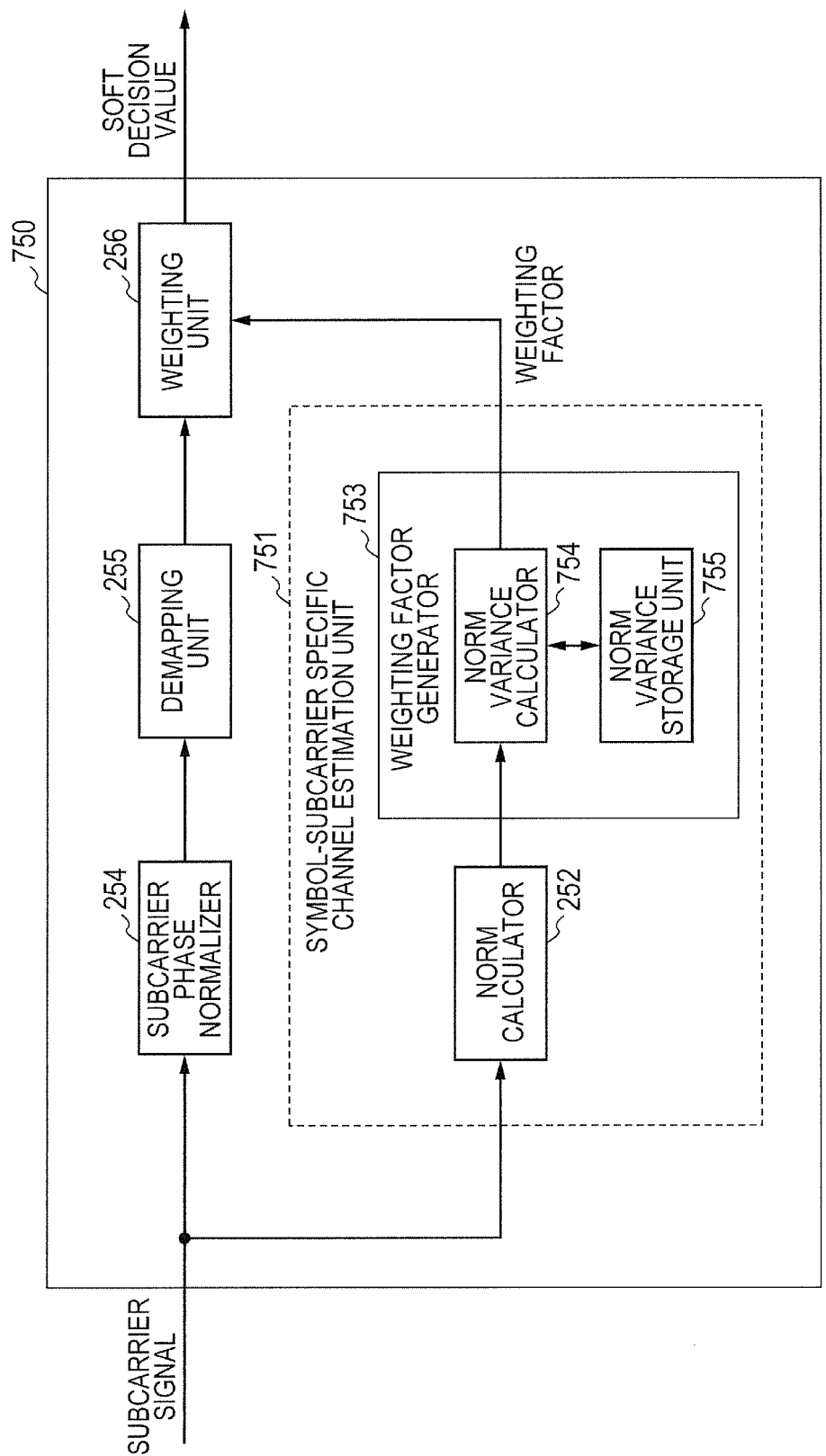
FIG. 16 is a block diagram of a demodulator (demodulation device) according to a sixth embodiment.

FIG. 16 is a block diagram of a demodulator 750 according to the sixth embodiment. The demodulator 750 includes a channel estimation unit 751, the subcarrier phase normalizer 254, the demapping unit 255, and the weighting unit 256.

The subcarrier signals input from the FFT unit 240 are input to the subcarrier phase normalizer 254 and to the channel estimation unit 751. The phase of each subcarrier signal is normalized by the subcarrier phase normalizer 254. Then, the subcarrier signal is demapped by the demapping unit 255. The bit string after demapping is weighted by the weighting unit 256 using the weighting factor obtained by the channel estimation unit 751. Then the weighted bit string is output to the FEC decoder 260 in the later stages, as the soft decision value. The channel estimation unit 751 obtains the weighting factor for each symbol and each subcarrier, and outputs to the weighting unit 256.

Next, the channel estimation unit 751 will be described in detail. The channel estimation unit 751 includes the norm calculator 252 and a weighting factor generator 753. The norm calculator 252 calculates the norm of the input subcarrier signal, and outputs to the weighting factor generator 753. The weighting factor generator 753 obtains the weighting factor for each power line phase by taking the statistics of the norm of the subcarrier signal in the symbol for each cycle of the AC power supply. The function of the weighting factor generator 753 will be described with reference to FIG. 17. Note that the frequency of the AC power supply is 50 Hz and one symbol cycle is 1 ms.

Figure 17:
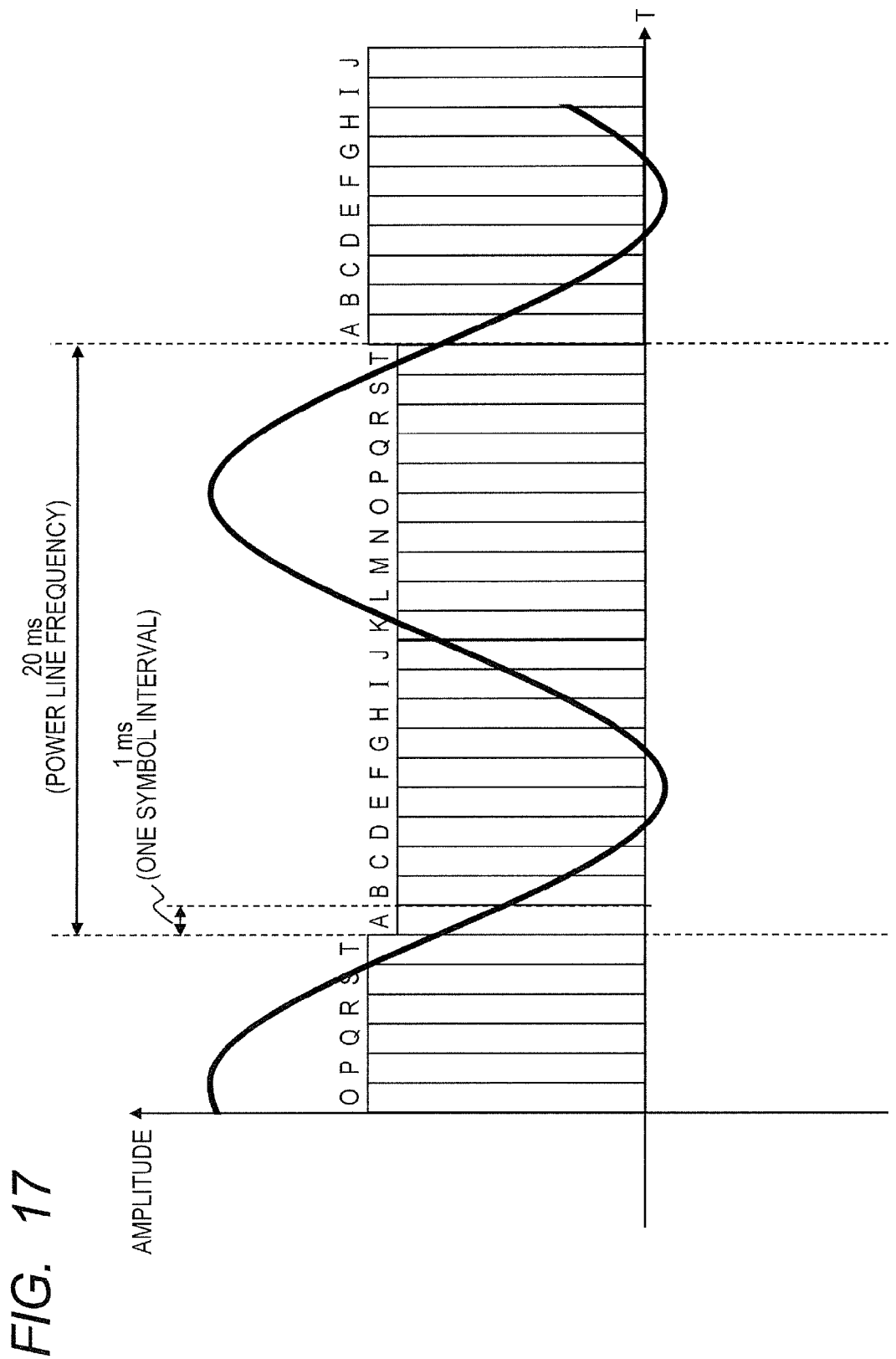
FIG. 17 is a view of the relationship between the AC power supply frequency and the OFDM symbol frequency.

One AC power supply cycle of 20 ms includes 20 symbols. Here, the 20 symbols are labeled by alphabetic characters A to T as shown in FIG. 17. The weighting factor generator 753 takes the statistics by collecting the norms calculated by the norm calculator 252 in the past symbol with the same label as the current symbol. Thus, the weighting factor generator 753 obtains the weighting factor for each power line phase.

More specifically, the weighting factor generator 753 includes a norm variance calculator 754 and a norm variance storage unit 755.

The norm variance calculator 754 generates the weighting factor by calculating the norm variance $\sigma^2$ for each subcarrier in the past symbol with the same label as the current symbol.

The norm variance storage unit 755 stores the norm variance $\sigma^2$ that is obtained for each label and each subcarrier. FIG. 18 shows the norm variances $\sigma^2$ stored in the norm variance storage unit 755. As can be seen from FIG. 18, the norm variance storage unit 755 stores the norm variance $\sigma^2$ for the number obtained by multiplying the number of labels by the number of subcarriers. Here, the norm variance storage unit 755 stores (20 symbols×n subcarriers=20n) norm variances $\sigma^2$. Then, based on the request of the norm variance calculator 754, the norm variance storage unit 755 reads the norm variance $\sigma^2$ for each subcarrier corresponding to the required current symbol from the norm variances $\sigma^2$ stored for each label. Then, the norm variance storage unit 755 outputs the obtained norm variance $\sigma^2$ to the norm variance calculator 754.

The norm variance calculator 754 adds the norm variance of each subcarrier signal received from the norm calculator 252, to the norm variance $\sigma^2$ for each subcarrier received from the norm variance storage unit 755 according to the equation (2). In this way, the norm variance calculator 754 obtains the norm variance $\sigma^2$ for each subcarrier from the start to the current symbol. The norm variance $\sigma^2$ obtained for each subcarrier is output to the weighting unit 256 as the weighting factor. Then, the existing data is overwritten by the obtained norm variance $\sigma^2$ and the updated data is stored in the norm variance storage unit 755.

With this configuration, the norm variance calculator 754 obtains the norm variance $\sigma^2$ by using the symbols transmitted in each cycle of one AC power supply. Thus, it is possible to obtain the norm variance $\sigma^2$ in which the noise depending on each power line phase is reflected. As a result, the decoding performance can be improved.

Note that in the sixth embodiment, as described above, the norm variance of the subcarrier signal in the particular symbol is obtained as the statistics of the symbols transmitted with the same power line phase. However, the present invention is not limited to this configuration. If the reference symbol point can be obtained by normalizing both the phase and the amplitude by using a pilot signal, it is also possible to generate the weighting factor by taking the statistics on the variation from the particular reference symbol point.

Seventh Embodiment

In the receiving device according to the sixth embodiment, possible to obtain the weighting factor appropriately reflecting the noise correlation corresponding to the power line phase, by taking the variation statistics based on the OFDM symbol received in each cycle of the AC power supply. Here, the power line phase varies with time if the cycle of the AC power supply is not a multiple of the OFDM symbol frequency. Thus, the receiving device according to the seventh embodiment is designed to obtain the weighting factor appropriately reflecting the noise correlation corresponding to the power line phase, even if the cycle of the AC power supply is not a multiple of the OFDM symbol frequency. This will be described below with reference to the drawings. Note that part of the description of the configuration described in the first to sixth embodiments is omitted for clarity of the invention.

Figure 19:
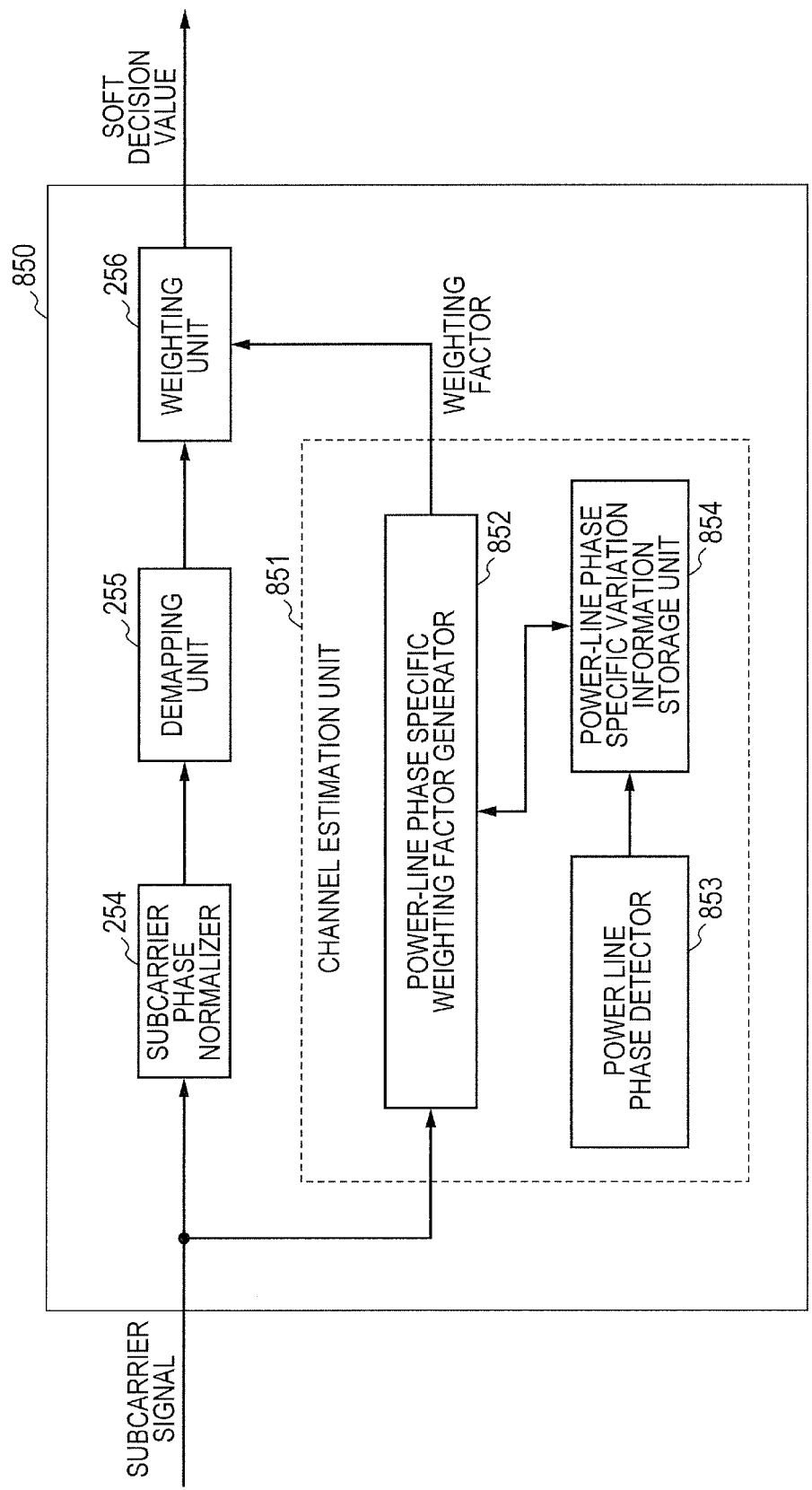
FIG. 19 is a block diagram of another configuration of the demodulator (demodulation device) according to the sixth embodiment.

FIG. 19 is a block diagram of a demodulator 350 according to the seventh embodiment. In the demodulator 850, a channel estimation unit 851 includes a power-line phase specific weighting factor generator 852, a phase detector 853, and a power-line phase specific variation information storage unit 854.

The phase detector 853 detects the current power line phase, and outputs the phase information of the current power line phase to the power-line phase specific variation information storage unit 854.

Figure 20:
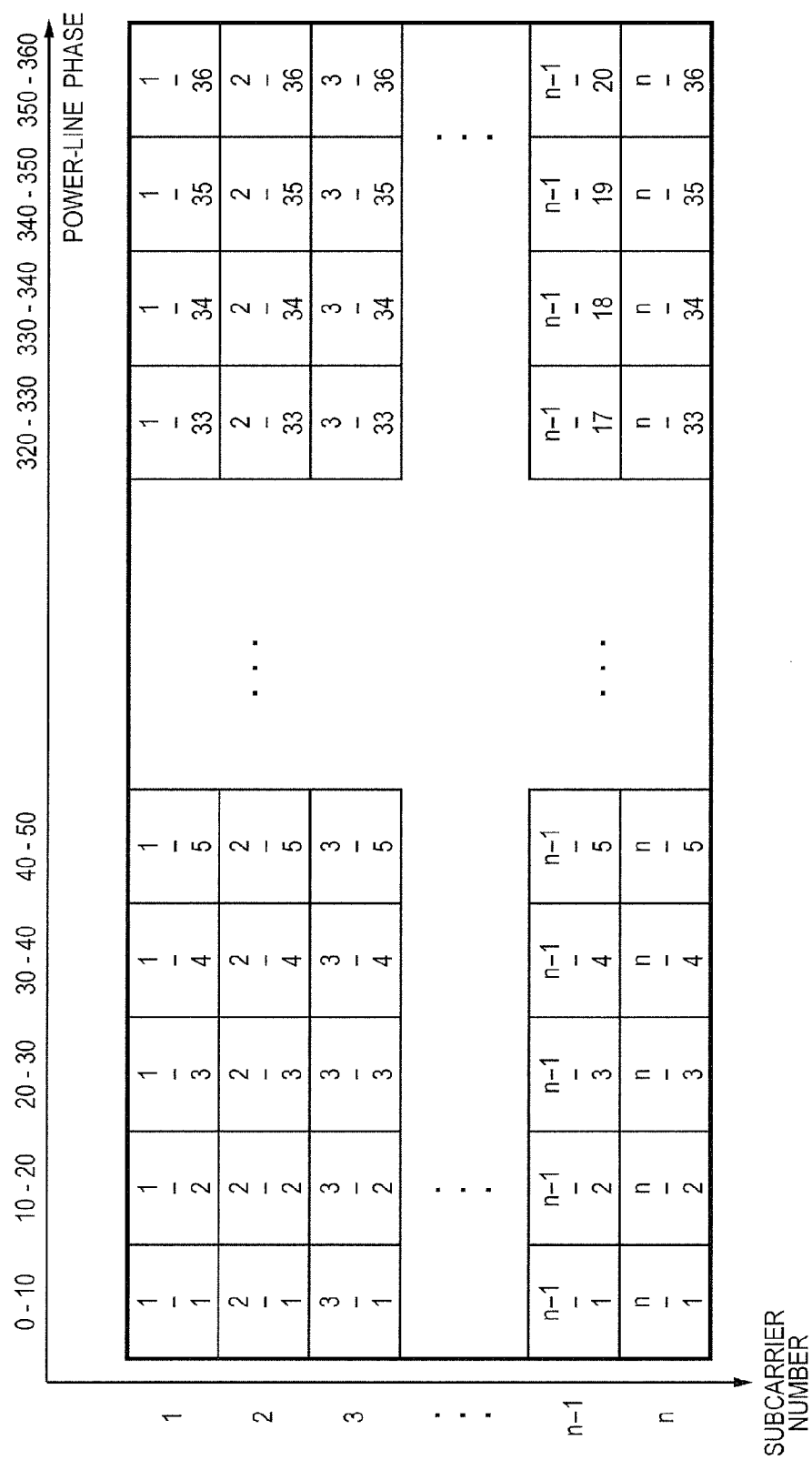
FIG. 20 is a view of a variation information table of the dispersion information in each power line phase of each subcarrier.

The power-line phase specific variation information storage unit 854 stores the variation information which is the statistics on a predetermined physical quantity that is obtained by the power-line phase specific weighting factor generator 852 for each power line phase. FIG. 20 shows the variation information stored in the power-line phase specific variation information storage unit 854. The power line phase is divided by 10 degrees each. The variation information corresponding to each phase and each subcarrier is managed and stored in a form of table. The power-line phase specific variation information storage unit 854 receives a variation-information read request from the power-line phase specific weighting factor generator 852. Then, the power-line phase specific variation information storage unit 854 reads the variation information corresponding to the current power line phase, namely, corresponding to the power line phase in the current symbol that is shown in the phase information input from the phase detector 853. Then, the power-line phase specific variation information storage unit 854 outputs the obtained variation information to the power-line phase-specific weighting factor generator 852.

The power-line phase specific weighting factor generator 852 generates the weighting factor for each subcarrier by calculating the statistics on a predetermined physical quantity of the subcarrier signal input from the FFT unit 240. Then, the power-line phase specific weighting factor generator 852 outputs the weighting factor to the weighting unit 256. In addition, the power-line phase specific weighting factor generator 852 outputs the variation information, which is the norm statistics, to the power-line phase specific variation information storage unit 854. The power-line phase specific variation information storage unit 854 overwrites the storage location of the corresponding power-line phase and subcarrier, with the variation information that is newly obtained by the power-line phase specific weighting factor generator 852. In this way, the power-line phase specific variation information storage unit 854 stores the new data.

Here, similarly to the first to fifth embodiments, the power-line phase specific weighting factor generator 852 can also perform weighting by taking the statistics of the norm. In this case, the power-line phase specific weighting factor generator 852 calculates the norm of the input subcarrier signal. The power-line phase specific weighting factor generator 852 receives the norm statistics which are the variation information corresponding to the power line phase in the OFDM symbol of which the particular subcarrier signal is transmitted from the power-line phase specific variation information storage unit 854. Then, the power-line phase specific weighting factor generator 852 obtains the weighting factor for each subcarrier by adding the norm calculated for each subcarrier and the norm statistics for each subcarrier received from the power-line phase specific variation information storage unit 854, according to the equation (1). The receiving device according to the seventh embodiment can also be configured in this way.

As described above, the receiving device according to the seventh embodiment includes a power line phase detector for detecting the power line phase in which the OFDM symbol is superimposed. The weighting factor generator generates the weighting factor for each power-line phase by calculating the statistics on a predetermined physical quantity of the subcarrier for each power-line phase. With this configuration, it is possible to obtain the weighting factor appropriately reflecting the noise due to the Power-line phase, according to each power-line phase. As a result, it is possible to improve the decoding characteristics compared to the case where weighting is performed by taking the statistics without taking into account the power-line phase.

Here, preferably, the receiving device according to the seventh embodiment further includes a storage unit for storing the statistics obtained by calculating the statistics on a predetermined physical quantity of the subcarrier signal for each power-line phase. The weighting factor generator includes a calculator for calculating the predetermined physical quantity of the subcarrier signal. The weighting factor generator generates the weighting factor in the particular power-line phase, by adding the calculated physical quantity to the statistics corresponding to the power-line phase that is read from the storage unit and detected by the power line phase detector. Here, an example of the predetermined physical quantity of the subcarrier signal can be the norm of the subcarrier signal, the distance from the reference symbol point, and the like. The receiving device according to the seventh embodiment may also be configured as described above.

Figure 21:
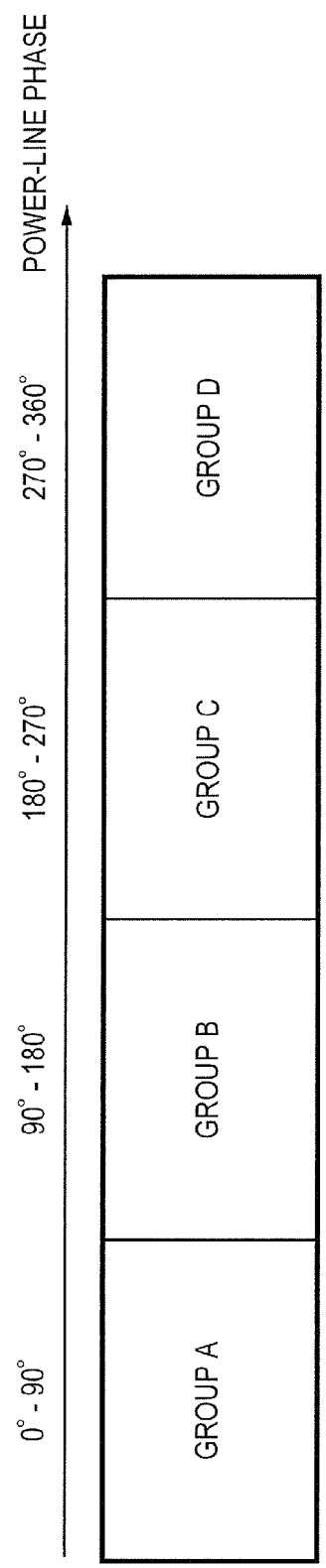
FIG. 21 is a view of the variation information (statistics) for each of the grouped power-line phases.

Note that as shown in FIG. 21, it is also possible to divide the power line phase into a plurality of groups, and store the statistics of the subcarrier signal to generate the weighting factor based on the statistics of the group corresponding to the power line phase in which the current symbol is superimposed. In other words, the receiving device can also include: a power line phase detector for detecting the power line phase in which the OFDM symbol is superimposed; an FFT processor for obtaining a subcarrier signal by applying the FFT process to the particular OFDM symbol; a calculator for calculating a predetermined physical quantity of the particular subcarrier signal; and a weighting factor generator for generating a weighting factor for each power line phase by calculating the statistics on the physical quantity for each group to which the detected power line phase belongs.

As described above, according to the exemplary embodiments of the present invention, the receiving device can obtain a soft decision value by taking the statistics of the norm that is ideally constant, and by generating the appropriate weighting factor from the variation in the statistics of the norm. Thus, it is possible to obtain a soft decision value to achieve good decoding performance with a small number of processes.

Note the in the above description, the receiving device calculates the norm for each subcarrier with respect to a plurality of subcarrier signals obtained by the FFT process. Then, the receiving device takes the statistics of the norm for each subcarrier to generate a weighting factor for each subcarrier, and weights each bit string generated by demapping each subcarrier, based on the weighting factor corresponding to the particular bit string. However, the present invention is not limited to this configuration. If the frequency selectivity is smaller than a predetermined reference value, it is also possible to calculate the norm, and the like, to represent one subcarrier signal for each symbol. In other words, the receiving device can also obtain a plurality of subcarriers by the FFT process, calculate the norm by selecting a predetermined subcarrier signal, generate a weighting factor by taking the statistics of the particular norm over a plurality of symbols, and uniformly weight the bit strings generated by demapping the subcarrier signals, based on the particular weighting factor. With this configuration, it is possible to significantly reduce the number of processes required for the generation of the weighting factor, while maintaining a certain level of degradation of the decoding characteristics.

Note that the present invention is not limited to the above described embodiments, and may be modified appropriately without departing from the scope of the present invention. For example, it goes without saying that the receiving device and the signal processing device can be formed by combining the embodiments. Also, it goes without saying that the communication device can be formed by combining the receiving device described in each embodiment and the transmitting device of the first embodiment.

Further, in the above description, the receiving device is used in the power line communication system, but the present invention is not limited to this example. The receiving device described in each of the first to fifth embodiments can also be used in a radio communication system. In this case, the receiver of the receiving device receives the OFDM symbol from a wireless transmission path through an antenna, and outputs the OFDM symbol to the FFT unit.

Furthermore, it goes without saying that the components constituting the receiving device can be realized by processing a program (software) by a signal processing device such as a central processing unit (CPU).

It should be noted that the above program can be stored in various types of storage media that can be accessed by a computer system. Further, the program can be transmitted through a communication medium. Here, for example, the storage media include flexible disk, hard disk, magnetic disk, optical magnetic disk, CD-ROM, DVD, ROM cartridge, RAM memory cartridge with battery backup, flash memory cartridge, nonvolatile RAM cartridge, and the like. The communication media include wired communication media such as a telephone line, wireless communication media such as a microwave line, and the Internet.

What is claimed is:

1. A power line communication system, comprising:
   a transmitting device configured to generate an OFDM symbol based on a transmitted data;
   a power line, and
   a receiving device, including:
      a receiver configured to receive the OFDM symbol from the transmitting device through the power line;
      an FFT processor configured to apply an FFT process to the received OFDM symbol to obtain a subcarrier signal;
      a demapping unit configured to demap the subcarrier signal to generate a bit string;
      a norm calculator configured to calculate a norm of the subcarrier signal;
      a weighting factor generator configured to generate a weighting factor by taking statistics of the calculated norm; and
   a weighting unit configured to obtain a soft decision value by weighting the bit string after demapping based on the weighting factor,
   wherein the weighting factor generator is configured to generate the weighting factor so that a greater a variation of the norm calculated by the norm calculator, a smaller a likelihood of the soft decision value.

2. The power line communication system according to claim 1,
   wherein the OFDM symbol is modulated by phase shift keying.

3. The power line communication system according to claim 1,
   wherein the weighting factor generator includes a norm variance calculator configured to calculate a variance or expected value in a plurality of symbols of the norm to generate the weighting factor.

4. The power line communication system according to claim 1,
   wherein the weighting factor generator includes:
      a norm variance calculator configured to calculate the variance and expected value in a plurality of symbols of the norm; and
      an SNR estimation unit configured to estimate an SNR based on the variance and the expected value in the symbols of the norm to generate a weighting factor.

5. The power line communication system according to claim 4,
   wherein the SNR estimation unit is configured to generate the weighting factor so that the estimated SNR is reflected in the likelihood of the soft decision value.

6. The power line communication system according to claim 3,
   wherein the weighting factor generator further includes a variance storage configured to store the calculated variance, and
   wherein the norm variance calculator is configured to calculate a new variance by adding a new norm calculated by the norm calculator to the stored variance.

7. The power line communication system according to claim 1, the receiving device further comprising a selector configured to select a subcarrier signal that is modulated by phase shift keying, from among the subcarrier signals obtained by the FFT process, and to output the subcarrier signal to the norm calculator, wherein the norm calculator is configured to calculate the norm of the subcarrier signal selected by the selector, and to output the result to the norm variance calculator.

8. The power line communication system according to claim 1, the receiving device further comprising a symbol interval selector configured to select the symbol interval for which the weighting factor generator takes the statistics of the norm, wherein the weighting factor generator is configured to generate the weighting factor by taking the statistics of the norm that is calculated by the norm calculator, over the symbol interval selected by the symbol interval selector.

9. The power line communication system according to claim 8, wherein the symbol interval selector is configured to determine the symbol interval to be selected by comparing the norm statistics obtained in a plurality of symbol intervals.

10. The power line communication system according to claim 1, wherein the norm calculator is configured to calculate the norm for each of the subcarrier signals obtained by the FFT process, wherein the weighting factor generator is configured to generate a weighting factor for each subcarrier by taking statistics for each subcarrier with respect to the norm of the calculated subcarrier signals, wherein the demapping unit is configured to demap the subcarrier signals to generate a bit string for each subcarrier, and wherein the weighting unit is configured to weight the hit strings after demapping for each subcarrier based on the weighting factor corresponding to each subcarrier, to obtain a soft decision value.

11. The power line communication system according to claim 1, the receiving device further comprising a decoder configured to extract data that is transmitted through the process of soft decision decoding by the soft decision value.

12. The power line communication system according to claim 1, the receiving device further comprising a power line phase detector configured to detect phases of the power line in which the OFDM symbol is superimposed, wherein the weighting factor generator is configured to generate the weighting factor for each phases of the power line by taking the statistics of the norm according to the phases.

13. The power line communication system according to claim 12, the receiving device further comprising a phase-specific statistics storage configured to store the statistics obtained by taking the statistics of the norm for each phases, wherein the weighting factor generator is configured to generate the weighting factor for each phases by adding the norm that is newly calculated by the norm calculator, to the statistics corresponding to the phase that is read from the phase-specific statistics storage and detected by the power line phase detector.

14. A communication method of the power line communication system including a transmitting device and a receiving device coupled each other through a power line, the method comprising:

transmitting an OFDM symbol from the transmitting device coupled to the power line to the receiving device;

obtaining a subcarrier signal by applying an FFT process to the OFDM symbol received from the transmitting device;

calculating a norm of the subcarrier;

generating a weighting factor by taking statistics of the calculated norm; and weighting the bit string generated by demapping the subcarrier signal based on the particular weighting factor to obtain a soft decision value, wherein the generating the weighting factor generates the weighting factor so that a greater a variation of the calculated norm, a smaller a likelihood of the soft decision value.

* * * * *